(12) United States Patent
Nasser et al.

(10) Patent No.: US 8,985,835 B2
(45) Date of Patent: Mar. 24, 2015

(54) METHOD FOR PRODUCING HOT-MIX ASPHALT

(76) Inventors: Claudio Macedo Nasser, Tres Rios-RJ (BR); Patricia Vasconcelos Correa Nasser, Tres Rios-RJ (BR)

(*) Notice: Subject to any disclaimer, the term of this patent is extended or adjusted under 35 U.S.C. 154(b) by 930 days.

(21) Appl. No.: 13/139,246

(22) PCT Filed: Aug. 2, 2009

(86) PCT No.: PCT/BR2009/000307
§ 371 (c)(1),
(2), (4) Date: Jun. 29, 2011

(87) PCT Pub. No.: WO2010/069016
PCT Pub. Date: Jun. 24, 2010

(65) Prior Publication Data
US 2011/0247525 A1  Oct. 13, 2011

(30) Foreign Application Priority Data
Dec. 19, 2008  (BR) ...................................... 0805496

(51) Int. Cl.
*E01C 19/10*  (2006.01)

(52) U.S. Cl.
CPC ......... *E01C 19/1004* (2013.01); *E01C 19/1063* (2013.01)
USPC ................................................ 366/7; 366/24

(58) Field of Classification Search
CPC .................................................. E01C 19/1063
USPC ..................................................... 366/22–25, 7
See application file for complete search history.

(56) References Cited

U.S. PATENT DOCUMENTS

| | | | |
|---|---|---|---|
| 396,616 A * | 1/1889 | Case | 57/300 |
| 3,866,887 A | 2/1975 | Potter | |
| 4,245,915 A * | 1/1981 | Bracegirdle | 366/12 |
| 4,784,216 A * | 11/1988 | Bracegirdle et al. | 165/64 |
| 2008/0224345 A1 | 9/2008 | Fox | |

FOREIGN PATENT DOCUMENTS

| | | |
|---|---|---|
| BR | PI9000246 | 12/1990 |
| BR | PI052289-4 | 1/2007 |
| BR | PI0801164-8 | 12/2008 |
| BR | PI0801211-3 | 12/2008 |
| DE | 102007019202 | 10/2008 |
| DE | 202007005756 | 10/2008 |
| WO | WO80/01816 | 9/1980 |

* cited by examiner

*Primary Examiner* — David Sorkin
(74) *Attorney, Agent, or Firm* — Alston & Bird LLP

(57) ABSTRACT

There is described a hot-mix asphalt plant intended for the production of hot-mix asphalt using a full percentage of milled asphalt product or using cold ingredients and filler charge for producing first grade hot-mix asphalt, comprised of a circular chamber 2 adapted to receive and mix milled asphalt product with solid asphalt additive or to receive and mix the cold ingredients and a filler charge with liquid asphalt cement, provided with a circular tubular coil 104 for circulation of thermal fluid or gas, secured next to the lower side part of the circular chamber 102, adapted with electrical resistors 123 or gas-fueled heaters to produce thermal energy in the form of heat.

8 Claims, 11 Drawing Sheets

METHOD FOR PRODUCING HOT-MIX ASPHALT

CROSS REFERENCE TO RELATED APPLICATIONS

This application is a national stage application, filed under 35 U.S.C. §371, of International Application No. PCT/BR2009/000307, filed Aug. 2, 2009, and claims priority to Brazilian Application No. PI0805496-7, filed Dec. 19, 2008, both of which are hereby incorporated by reference in their entirety.

FIELD OF THE INVENTION

The present invention relates generally to a plant and a method that constitute an improvement over conventional hot-mix asphalt plants adapted with one or several driers, with one or several burners using fossil fuels for the production of a hot-mix asphalt, particularly plants intended for the production of hot-mix asphalt using a small or large percentage of a milled asphalt product to produce hot-mix asphalt. The invention refers comparatively to the prior art hot-mix asphalt plants that use forced exhaust, fire, with direct flame for heating and drying the cold ingredients in order to provide a hot-mix asphalt.

DESCRIPTION OF RELATED ART

Plants and methods for the production of hot-mix asphalt are widely known in the art. As some relevant examples of the prior art in this particular field, there may be cited, among others, the following documents: WO 80/01816; BR PI9000246-6; BR PI0502289-4; BR PI0801211-3; DE 20 2007 005 756.3; and BR PI08011648-8 (DE 10 2007 019 202.0).

Document WO 80/01816 disclosed the mixing of the cold ingredients and the binder and additives in a pressure chamber at an extremely high pressure for this type of process. The inventor did not create a specific formula for his process and it is clear in this document that the production attained thereby would be inexpressive. No partial recycling formula is proposed. This patent is believed to have fallen into the public domain without any further proposal of development or improvement from the part of its author.

In document BR PI 9000246-6 there is disclosed an adaptation to a gravity-driven plant which is extremely heavy, uses a large amount of equipment, is extremely expensive, consumes a large amount of electric power, high temperatures, uses direct flame, forced exhaust, does not weigh the fines (soot) returned by the screw auger, or directly added to the pugmill, and does not heat the filler charge. The proposed adaptation produces batches of only at most 4 tons per hatch. In addition to the extremely short time of mixing of the overheated ingredients with the preheated milled asphalt product the use of high temperatures greatly aggravates global warming issues, as well as there is no explanation to inject the same amount of liquid asphalt cement in the pugmill.

In document BR PI0502289-4 A there is disclosed a system evidencing a large series of disadvantages, particularly the form of heating used (LPG cylinders), which is both costly, dangerous to use in public environments and logistically complicated, and the extremely low production of each individual equipment proposed, which would require an exceedingly large amount of units for very little actual work performed.

In document BR PI801164-8 there is disclosed a machine which performs both the function of removing the old asphalt layer from an existing paved surface, which it appears quite suitable to perform, but evidences a series of disadvantages in connection with the intended recycling process. The machine will perform a good service in milling the asphalt cover of paved roads and structural layers thereof, but uses foamed asphalt as binder, which will most probably not produce good results. The machine performs an extremely fast process, without allowing the milled asphalt product to be properly heated/softened and mixed. The full hot-recycling of an asphalt pavement is a rigorous process, and will probably never be feasible "on the run", but rather in a separate plant using an extremely rigorous process.

None of these documents considers the substitution of forced exhaust, direct flame for heating and drying the cold ingredients that make up the hot-mix asphalt, none of these processes heats the filler charge together with the cold ingredients, none produces 750 tons per hour, in individual batches, none is able to recycle milled asphalt product without using a new cold ingredient in the process, none uses variable speed and longer mixing time, none recycles a damaged load returned in a dumper truck, that is, a hot-mix asphalt carried by the truck upon having cooled due to unexpected adverse weather or other problems while being carried to the site where it would have been applied, none makes use of combined solar thermal energy, but rather petroleum byproducts, none weighs the soot (fine powder) that returns to the hot-mix asphalt, none divides in at least three times the mixture of the hot ingredients or other fractions, none uses temperature reducing means, that is, they do not make use of the heat from the vapors and gasses to heat the cold ingredients, none of them has an air purifier filter coupled to the plant.

BACKGROUND OF THE INVENTION

It is known in the art that in order to mix a milled asphalt product with cold ingredients in order to produce a hot-mix asphalt, firstly the cold ingredients are heated and dried in an internal rotary drum of a counter-flow drier with subsequent mixing, with a small or large percentage of a milled asphalt product and liquid asphalt cement in an outer mixing sleeve or in a "pugmill" separately with relation to the burner flame, to thereby form the hot-mix asphalt appropriate for use in asphalt paving applications.

One other process consists in placing the milled asphalt product to be heated and dried within a circular chamber with rotary axles provided with vanes with heating by electrical resistors or gas-fueled heaters and mixing with solid asphalt additive to produce a fully recycled hot-mix asphalt or placing the cold ingredients to be heated and dried within a circular chamber with rotary axles provided with vanes and heating by means of electrical resistors or gas-fueled heaters and mixing with liquid asphalt cement to produce a first grade hot-mix asphalt.

A circular chamber for heating, drying and mixing the cold ingredients with liquid asphalt cement for producing a first grade asphalt mix or for heating, drying and mixing a milled asphalt product with a solid asphalt additive in order to produce recycled hot-mix asphalt manufactured by the company SOMA—Empresa de Prestação de Serviços LTDA. is of the type that is schematically depicted in FIG. 1, comprising a circular chamber 2 mounted in common with the structure 17 in parallel to the horizontal position. The four rotary half-shafts provided with vanes are mounted to the structure 17 and provided with a speed varying means and are driven at rotary speeds of 3.3 rpm on heating and drying, of 6.6 rpm on mixing and of 9.9 rpm on leaving the chamber upon the hot-mix asphalt being uniformly finished, such half-shafts being connected to a vertical axle 16 driven by an appropriate reducer drive gear assembly 20 (not shown). The chamber is provided with electrical resistors or gas-fueled heaters 22 to provide thermal heating, by heat conduction, at the bottom and side parts of the chamber 2. The chamber 2 has at the bottom and sidewalls thereof plates 23 coated with high-hardness, friction-resistant cast steel 26 to receive the cold ingredients through the inlet 30 or the milled asphalt product also by way of inlet 30. One outlet 31 is provided at the bottom for letting out the recycled, uniform and finished first grade hot-mix asphalt taking more time to heat, dry and mix the cold ingredients with liquid asphalt cement, in order to produce a hot-mix asphalt and taking more time to heat, dry and mix the milled asphalt product with solid asphalt additive to produce a fully (100%) recycled hot-mix asphalt. The entire circular chamber is coated with heat insulating material 53 to avoid thermal energy losses. An outlet is provided at the topmost part to let out the filtered and clean gas through the flue 34 into the atmosphere. The circular heating, drying and mixing chamber 12 also supports a plurality of filter elements 32. Within the circular chamber 2, in the zone near the heating plates, the mixing vanes 40 scrape the bottom and side surfaces 23 to allow the transfer of heat, by radiation and convection, for heating and drying the cold ingredients or milled asphalt product. The circular chamber also accommodates a pipe 45 appropriate for injecting liquid asphalt cement, that is separated from the rotary shaft 25 by a sufficient distance to provide a space between the pipe 45 provided with spray nozzles 44 and the mixing vanes 40. The feeding, through inlet 30, of the cold ingredients or milled asphalt product also fed through inlet 30, into the circular chamber 2, is provided by a conveyor belt adequate for the cold ingredients or milled asphalt product 35 incoming from the cold ingredients silos/tanks 55 and milled product silos/tanks 57 (not shown). The cold ingredients or the milled asphalt product is heated and dried while circulating through the heating, drying and mixing shafts 25, clockwise, within the horizontal circular chamber, where the later is not provided with exhaust means for the combustion gases, and the particulate matter (dust and soot) therein is incorporated into the hot-mix asphalt by gravity. After weighing the cold ingredients, the liquid asphalt cement is also weighed in a cylindrical container 54 (not shown) and is transferred to the circular chamber by means of an asphalt pump 52 to be injected through the asphalt pipe 45 and the spray nozzles 44 into the hot-mix asphalt. In addition to mixing the cold ingredients with the liquid asphalt cement or the milled product with the solid asphalt additive, the vanes 40 also transport the hot-mix asphalt or the recycled homogeneous finished asphalt mix towards the outlet 31 of the circular chamber wherefrom the hot-mix asphalt or the recycled hot-mix asphalt is discharged from the circular chamber 2.

Conventional plants use rotary parallel single directional flow driers to heat and dry the milled asphalt product and rotary driers operating in counter-flow to heat and dry the cold ingredients to be mixed with liquid asphalt cement. However, the conventional plants that make use of counter-flow driers and/or parallel single directional flow to produce hot-mix asphalt evidence various disadvantages, for example the conventional plants are limited in terms of the percentage of milled asphalt that may be used to produce partially recycled hot-mix asphalt. The conventional plants also generate and emit smoke and other harmful emissions produced by the milled asphalt product. In conventional plants, the cold ingredients are received within the drying drum, and are consequently subjected to direct exposure to the flame and the hot stream produced by the process of combustion that takes place in the drier. In conventional plants, the "filler" charge leaves through an opening in the gate of the "filler" tank, and is directly sent to the "pugmill" or at the base of the hot elevator without any control of the "filler" amount. The conventional plants use a fuel temperature rectifier means as well as a flame adjusting means. However, the conventional hot-processing plants that make use of a drier with an internal drum for heating and drying the cold ingredients and an outer sleeve or chamber to mix the superheated cold ingredients with fine milled product and a second drying drum to heat to a lower temperature the coarse milled product and mix everything in the "pugmill", are also subject to various disadvantages, for example, they are unable to control the final temperature of the mixture of superheated cold ingredients with the fine milled product, and they do not totally recycle (to a level of 100%) the milled product. The conventional plants introduce the milled product into different driers depending on the grade (coarseness or fineness) of the milled product. The conventional plants inject the same amount of hot asphalt, unexplainably, into the cold ingredients and into the milled asphalt product in the "pugmill", in spite of the fact that one of these already has an asphalt content and the other has no asphalt content at all. The conventional plants receive, at the pugmill, milled products with temperatures different from one another. Furthermore, the conventional plants make use of an auger conveyor, and/or a fines recovery valve or similar means, such that the fine ingredient particles and the milled product particles, that are entrained in the hot and toxic gas exhaust stream, may return to the hot-mix asphalt process. The conventional plants heat the milled product by overheating the cold ingredients. Such contact burns the asphalt contained in the milled product, thereby jeopardizing the quality of the asphalt mixture and also increases the production of smoke and other harmful emissions. The conventional plants receive, in the "pugmill" the liquid asphalt cement, in the same amount, for the combination of fine milled product/cold ingredients/coarse milled product, for producing partially recycled hot-mix asphalt. The conventional plants use two conveyor types (inclined ramp and vertical ramp) for conveying hot substances at temperatures between 150° C. and 165° C. to the "pugmill". The conventional plants do not have controlling means to control the temperature of the milled asphalt product, and the temperature of the mixture of superheated cold ingredients and fine milled product will be lowered upon contact with the coarse milled product, which is heated in a separate drier at a lower temperature. The conventional plants produce direct emissions of $CO_2$ (carbon dioxide or carbon gas) which emissions increase the concentration of $CO_2$ in the atmosphere, and contribute to aggravate the greenhouse effect. The conventional plants work using two driers, two burners that consume a large amount of diesel fuel or heavy oil and a combination of heavy oil and gasoline, particularly in the first drier, for heating the fine milled product by means of the superheating of the cold ingredients for the production of partially recycled hot-mix asphalt.

The conventional plants are unable to ensure that the final temperature of the hot-mix asphalt, using a high percentage of milled asphalt product, might be ideal, since there is mixed coarse milled product having a known temperature with superheated cold ingredients and fine milled product, without any control of temperature, which fact prevents the ideal situation that would consist in the production of hot-mix asphalt using a high percentage of milled product with an ideal known temperature.

It would be important to provide an apparatus and a method whereby the asphalt plant might be able to produce hot-mix asphalt using a full percentage of milled product. It would also be important that such plant might be able to heat and dry the cold ingredients without using the flame of a fossil fuel burner. It would further be important that such plant might be able to use combined solar thermal energy (CSTE), for example, with electric power or gas-fueled or biodiesel-fueled heaters 100 to produce, without exhaustion, hot-mix asphalt. it would also be important that such plant might be able to reduce the amount of smoke and other harmful emissions produced by the milled asphalt product. This plant would be more interesting if it were able to produce high-quality hot-mix asphalt. Furthermore, it would also be interesting that such plant might be able to cool down a large part of the thermal heating produced to provide the hot-mix asphalt. It would be even more important that such plant might be able to produce recycled hot-mix asphalt without needing to control the grade and amount of the milled asphalt product. It would be even more interesting that such plant did not require the introduction of the milled product into different driers in order to produce hot-mix asphalt.

It would be further interesting that the asphalt plant may be able to operate in the same manner of a, gravity collector with natural sedimentation, easily operable, with slow gas outflow velocity, allowing the particles of dust and soot to settle in consequence of the weight thereof, and further facilitating the small particles in suspension to also settle down and lay deposited on the hot-mix asphalt, leaving practically only the gas to cross at higher speed the outer surfaces of the filter elements.

It would be even more important that the plant for hot-mix asphalt to be able to replace the fossil fuels with efficient use of combined solar thermal energy (CSTE), with energy efficiency to produce lesser amounts of carbon gas, in order to produce hot-mix asphalt without however compromising the aspects of quality and of production.

It would be even more important if the hot-mix asphalt plant were capable of avoiding contaminating the cold ingredients or avoid soiling the plant at any time that the same is subjected to calibration.

It would be even more important that the plant for producing recycled hot-mix asphalt might be able to reduce the consumption of energy and the extraction of raw materials, and also reduce the emission of greenhouse gasses associated with generation of energy using fossil fuels.

It would be even more important that the asphalt plant might be able to produce hot-mix asphalt using cold ingredients with a size of up to 75 mm.

It would be even more important if the asphalt plant were able to produce fully recycled (100%) hot-mix asphalt using a full percentage of granular milled product, in chunks or pieces with sizes of up to 100 mm.

It would be interesting to provide an asphalt plant that would not use forced exhaust, fire, such as the direct flame of a burner, for heating and drying the cold ingredients in order to produce the hot-mix asphalt, and that would furthermore cost an equivalent price of a conventional gravity-type plant.

It would be interesting to provide an asphalt plant that might not require recirculation of a part of the hot and toxic gases arising from the combustion of a burner with air blowers.

It would be interesting to provide an asphalt plant capable of recovering and reusing the charge of a dumper truck filled with hot-mix asphalt that cooled down at the end of a pavement hole and crack-filling operation.

It would be interesting to provide an asphalt plant capable of avoiding to simultaneously inject equal amounts of liquid asphalt cement into the cold ingredients and into the milled asphalt product to produce recycled hot-mix asphalt.

It would be interesting to provide an asphalt plant capable of contributing positively to the environment, which latter is starting to show signs of serious depletion of its natural resources, by means of an economy of raw materials. This could constitute a contribution to the actions intended to reverse such serious problem.

It would be interesting to provide an asphalt plant that would not require forced mechanical exhaustion, cyclone means with static or dynamic separators, helical auger conveyors, fines recovery valve, extractor coils to return the dust and soot particulate matter from the cold ingredients and or from the milled asphalt product that are entrained with the exhaust gas stream in the drier.

It would be interesting to provide an asphalt plant that would not be subjected to limitations such as of a maximum stone size of 25 mm and that would also not be limited by the amount of the "filler" charge added to produce hot-mix asphalt.

It would be interesting to provide an asphalt plant able to perform the recycling process without using different temperatures of the milled asphalt product to produce hot-mix asphalt using a high percentage of milled product.

It would be interesting to provide an asphalt plant capable of heating, drying and mixing for a longer time the cold ingredients, the "filler" charge and the liquid asphalt cement to produce a hot-mix asphalt that would exhibit better quality and greater strength for purposes of asphalt-based paving operations.

It would be interesting to provide a plant for producing recycled hot-mix asphalt that would be able to heat, dry and mix for a longer time the milled product with solid asphalt additive to produce a fully recycled hot-mix asphalt, evidencing better quality and enhanced strength for asphalt-based road paving applications.

It would be interesting to provide a plant capable of making use of renewable energy resources, that would contribute less to the global warming effect, to produce hot-mix asphalt using a full percentage of milled product, mainly originating from defective road paving surfaces, that is, with the presence of potholes, cracks, wheel tracks, etc., to reuse the same for repairing such defects without requiring an entirely new asphalt recapping.

It would be interesting to provide an asphalt plant that would not require the removal of the heated and dried cold ingredients, which produces a sizable amount of dust and soils the plant facilities, from the tank where it is kept for discharging the asphalt mix every time that the plant needs to be shut down.

It would be interesting to be able to provide a plant for the production of hot-mix asphalt without needing to drop onto the floor or withdraw any cold mix used to calibrate the plant or without needing to inverse the direction of conveyance of the cold feed, or yet without contaminating the cold ingredients used for calibration.

It would be interesting to produce an asphalt plant capable of producing in one sole batch the load to be carried in a dumper truck, with finite weight and dosage of the cold ingredients, the "filler" charge and the liquid asphalt cement for the production of hot-mix asphalt.

It would also be very interesting to provide a plant capable of producing in one single batch the load to be carried by a dumper truck, with finite weight and dosage of the milled product and of the solid asphalt additive for producing 100% (one hundred percent) recycled hot-mix asphalt.

It would be even better if such plant were able to reprocess by re-milling the load of a dumper truck having returned from the worksite without discharging, upon arriving thereat under rainy weather with the consequent impossibility of applying the mixture.

It would be even better if such asphalt plant were able to perform recycling using a full percentage of milled product upon exposure thereof to the environment, in a wet condition, without compromising its quality. It would be even more desirable if such plant were capable of producing hot-mix asphalt without varying the amount of liquid asphalt cement and without varying the temperature of the cold ingredients.

It would be even better if such asphalt plant were able to correct the hot-mix asphalt upon a failure in the injection of liquid asphalt (either by excess or by default). It would be event better if such plant were able to produce hot-mix asphalt upon acquiring carbon credits by production in tons.

The main advantage of the present invention resides in the provision of an apparatus and a method allowing a plant to mix hot asphalt using a full percentage of milled product. One other advantage of the preferred embodiment of the invention resides in that the same produces hot-mix asphalt without using a fossil fuel burner and forced exhaust, fire, flame, for heating and drying the cold ingredients. One other significant advantage of the invention consists in that it provides for the return to the process, by gravity, without any means of mechanical conveyance, of the particulate matter held in suspension, which is indispensable for the stability and quality of the first-grade hot-mix asphalt or fully recycled hot-mix asphalt.

One other advantage resides in weighing the "filler" charge instead of receiving the same through an outlet gate of the "filler" tank falling directly into the "pugmill" or at the foot of the hot-mix elevator.

One other advantage of the invention resides in that there is produced thereby a high quality hot-mix asphalt. One further advantage consists in the production of hot-mix asphalt using combined solar thermal energy (CSTE). Yet another preferred advantage of the invention resides in that it is not necessary to recycle large amounts of gases produced by the drier.

Another advantage of the preferred embodiment of the hot-mix asphalt plant resides in the fact that the same does not operate with a plurality of driers for introducing and processing different grades of milled product.

One advantage of the invention is that it does not require different grades and proportions of milled product, the same does not need to be graded and provided in given proportions for purposes of control of the asphalt mix produced therewith.

BRIEF DESCRIPTION OF THE FIGURES

Additional advantages of the invention will become apparent upon an examination of the drawings and of the description of the preferred embodiments of the invention as depicted in the drawings attached hereto, with reference numerals as presented in the following.

Figure 1:
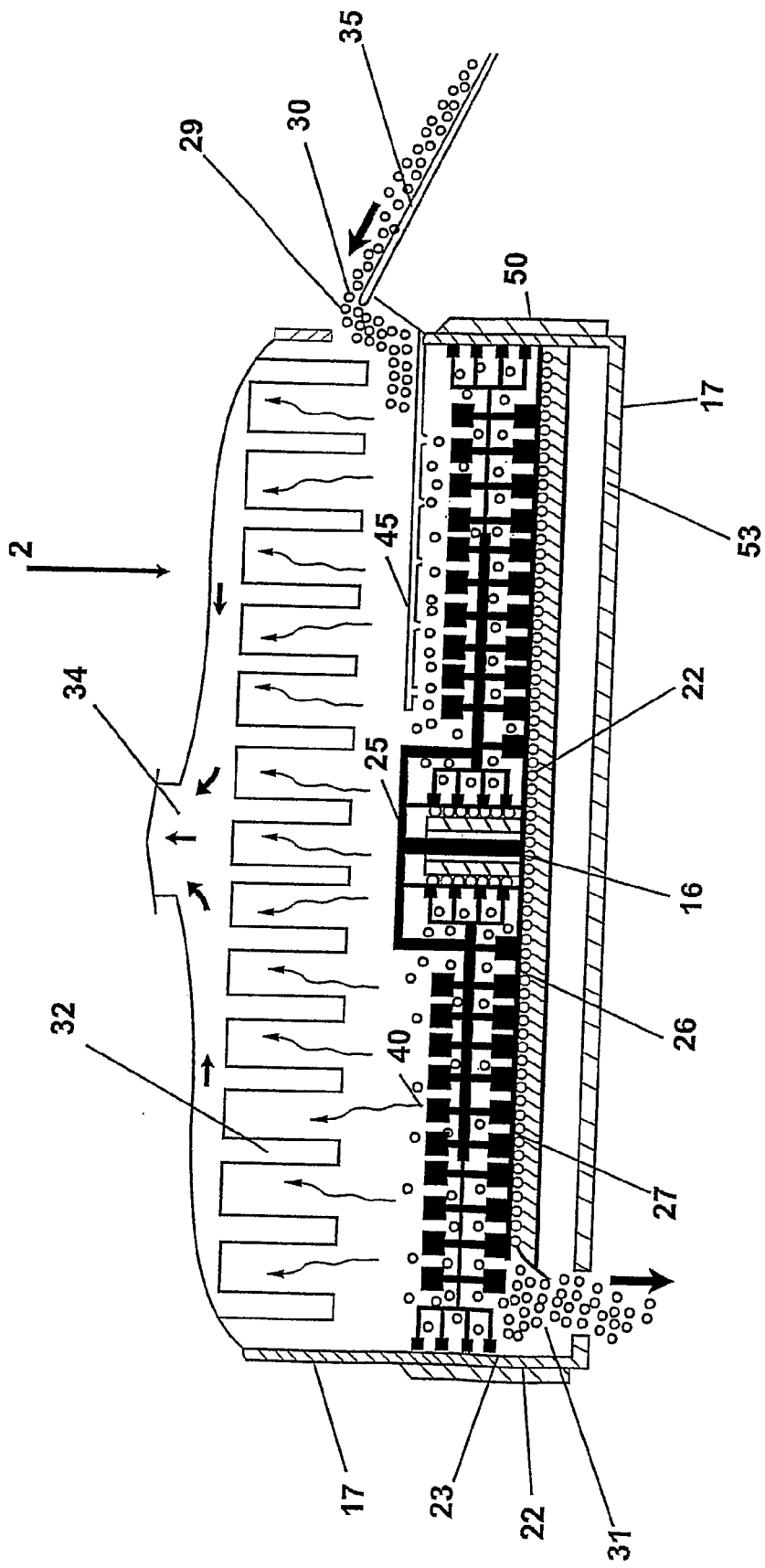
FIG. 1 illustrates a circular chamber for heating, drying and mixing cold ingredients with liquid asphalt cement.

TECHNICAL TERMS USED IN THE
DESCRIPTION OF THE INVENTION

As used herein, the expression "heat exchanger" refers to any structure that is adapted to receive thermal fluid or gas to circulate in a coil capable of transferring thermal energy in the form of heat from the hot source to the cold receiver to lower the temperature of the gases being discharged into the atmosphere.

As used herein, the term "solgasco" refers to any device adapted to generate similar heating using thermal solar energy combined with electrical energy or gas that might be usable for heating and drying cold ingredients and milled asphalt product relatively to the production of the hot-mix asphalt.

As used herein, the expression "oilgas coil" refers to any device adapted to generate a thermal stream between a hot source and a cold receiver for transferring thermal energy in the form of heat from one position to another by means of thermal fluid or gas.

As used herein, the expression "LAC—liquid asphalt cement" refers to a substance or material used in combination with cold ingredients, cold feed, and similar with regard to the hot-mix asphalt.

As used herein, the expression "gravity pre-separator" refers to any device adapted to separate dust and particles coated with milled asphalt product within a gas stream, without using forced exhaust means.

As used herein, the expression "circular chamber" refers to any device adapted to process the materials comprised in the mixture, such as cold ingredients, cold feed, milled asphalt product, liquid asphalt cement, solid asphalt additive and similar materials for the production of hot-mix asphalt.

As used herein, the expression "milled asphalt product" refers to materials that have been heretofore used to produce hot-mix asphalt.

As used herein, the expression "clean energy" relates to any apparatus adapted to lower the emissions of carbon dioxide or carbon gas to alleviate the greenhouse effect arising from any industrial facility, particularly those that use burners fed with diesel fuel, heavy oil, and combinations of heavy oil and gasoline.

As used herein, the expression "combined solar thermal energy (CSTE) refers to any device adapted to operate with the materials used for heating purposes, such as piping coils, electrical resistors, gas heaters, used in combination with solar thermal energy.

As used herein, the expression "alternative renewable energies—ARE" refers to any structure adapted to receive and transfer the sun rays and to produce hot-mix asphalt using renewable energy sources.

As used herein, the expression "solid asphalt additive—SAA" refers in particular to any substance or material characterized by providing a binding relationship between a milled asphalt product as well as to recover the fines lost in the cold asphalt milling operation and with the purpose of producing totally—100%—recycled hot-mix asphalt.

As used herein, the term "preheating" refers to any device that is adapted to preheat the cold feed located in the cold tank prior to the conveyance thereof to the circular chamber for producing hot-mix asphalt, for the purpose of lowering the temperature of the gases produced on heating and drying the cold ingredients.

As used herein, the expression "milled asphalt product 100" refers to any structure prepared for producing fully recycled hot-mix asphalt with granular asphalt products, in the form of chunks or in pieces with sizes of up to 100 mm.

As used herein, the term "asphalweigh scales" refers to any structure that is adapted to receive the asphalt cement and weigh the same per individual and finite batch, instead of weighing the same by volume with mass flow.

As used herein, the term "ingredientweigh scales" refers to any structure that is adapted to receive the cold ingredients and weigh the same per individual and finite batch, instead of weighing the same by volume, in the amount passing on the conveyor belt, by mass flow.

As used herein, the expression "chamber plenum" refers to any structure that is adapted to avoid that the asphalt plant might have to be limited to be able to operate in terms of excess moisture in the cold ingredients or in the milled asphalt product.

SUMMARY OF VARIOUS EMBODIMENTS OF THE INVENTION

The invention described and claimed herein comprises a plant for hot-mix asphalt, to produce, without exhaustion, hot-mix asphalt using a full percentage of milled asphalt product or to produce hot-mix asphalt using cold ingredients and "filler" charge using combined solar thermal energy (CSTE).

The preferred plant for mixing hot asphalt according to the invention operates by batches, mixed in previously dosed proportions, and comprises one sole circular chamber adapted to receive the granular milled asphalt products, in chunks or pieces with sizes of up to 100 mm. The circular chamber is adapted to produce thermal energy in the form of heat by means of a circular coil provided with electrical resistors or gas-fueled heaters. The circular coil is secured next to the lower side part of the circular chamber. This circular coil is connected by means of piping to the combined solar thermal energy (CSTE) module panel, receiving solar radiation and being further provided with electrical resistors or gas-fueled heaters directly located in the side walls of the chamber to operate automatically whenever there is no sunlight available. The said solar module panel contributes to increase the plant's thermal energy production capacity for heating, drying and mixing using a full percentage of milled asphalt product with solid asphalt additive for producing fully recycled hot-mix asphalt. The circular chamber is further adapted to receive the cold ingredients with size of up to 75 mm and the "filler" charge and produce heat with combined solar thermal energy (CSTE) for heating and drying the cold ingredients in order to produce hot-mix asphalt.

The preferred embodiment of the invention, the plant for producing hot-mix asphalt using combined solar thermal energy (CSTE) further comprises a cooling system using a heat exchanger to lower the temperature of the hot gas and vapor being discharged into the atmosphere upon passing through the air purifier filter adapted to provide the circulation of thermal fluid heated in two coils within the circular chamber used for heating, drying and mixing. The first coil is located above the rotary axles and transfers heat to the inner side walls of the cold ingredients tank to preheat the same; the second coil, which also lowers the temperature of the vapor and the gas produced in the chamber, is located next to the filter elements at the upper part of the air purifier filter. It receives the thermal fluid coming from the cold ingredients tank and follows to the first source (first coil) to return to the thermal stream system. The preferred embodiment of the apparatus according to the invention, to wit, the plant for producing hot-mix asphalt using combined solar thermal energy (CSTE), also includes a blower provided next to the second coil to blow the stream of vapor and gas produced in the process of production of hot-mix asphalt.

The invention described and claimed herein further comprises a method for the production of hot-mix asphalt comprising a full percentage of milled asphalt product using combined solar thermal energy (CSTE) or for the production of hot-mix asphalt with cold ingredients and "filler" charge using combined solar thermal energy (CSTE). The method comprises the provision of a plant for hot-mix asphalt adapted to produce hot-mix asphalt with a full percentage of milled asphalt product using combined solar thermal energy (CSTE) or for the production of hot-mix asphalt with cold ingredients and "filler" charge with combined solar thermal energy (CSTE). The hot-mix asphalt plant comprises one sole chamber adapted for receiving and mixing the products using a full percentage of milled asphalt product with solid asphalt additive. The chamber is adapted to produce heat by means of a combined source of solar and electric energy, solar and gas energy that transfers thermal energy to the thermal fluid or gas circulating in a piping coil installed next to the lower side part of the chamber for heating, drying and mixing milled asphalt product and producing fully recycled hot-mix asphalt. The chamber is further adapted to receive the cold ingredients, the "filler" charge, ground tires, recycled rubber, pitch fibers, carbon nanotubes, microspheres, synthetic fibers, solid asphalt additive, and to produce heat using combined solar thermal energy (CSTE) for heating, drying and producing the first grade hot-mix asphalt. The method further comprises the conveyance of the granular milled asphalt product, in the form of chunks or pieces with sizes of up to 100 mm to the chamber for heating, drying and mixing the milled asphalt product with solid asphalt additive for producing fully recycled hot-mix asphalt, conveyance of the cold ingredients with size of up to 75 mm and "filler" charge to the chamber for heating, drying and mixing, for producing first grade hot-mix asphalt.

In the preferred method of producing hot-mix asphalt using a full percentage of milled product, the milled product and the solid asphalt additive are heated to a temperature identical to the final temperature of the recycled hot-mix asphalt, and the cold ingredients are heated to a temperature lower than the final temperature of the finished hot-mix asphalt. The preferred method for producing hot-mix asphalt using a full percentage of milled asphalt product includes the separation of the cold ingredients to produce recycled hot-mix asphalt, and the combination of granular milled product, in chunks or pieces with particle sizes of up to 100 mm with solid asphalt additive constitutes one hundred percent (100%) of the materials used to produce recycled hot-mix asphalt.

Therefore, the object of the present invention comprises the provision of a plant for producing hot-mix asphalt using a full percentage of milled asphalt product and for heating, drying and mixing the product using combined solar thermal energy (CSTE) to produce recycled hot-mix asphalt or to produce hot-mix asphalt, characterized by comprising:

(a) a circular chamber adapted for receiving and mixing solid asphalt additive and milled asphalt product in bulk, in the form of chunks or pieces with sizes of up to 100 mm, at the speeds of 3.3 rpm; 6.6 rpm and 9.9 rpm;

(b) a circular chamber adapted to operate with combined solar thermal energy (CSTE) to produce thermal energy in the form of heat for heating and drying the milled asphalt product;

(c) a circular chamber adapted for receiving and mixing the cold ingredients with size of up to 75 min and the "filler" charge; at the speeds of 3.3 rpm; 6.6 rpm and 9.9 rpm;

(d) a circular chamber adapted to operate with combined solar thermal energy (CSTE) to produce thermal energy in the form of heat for heating the cold ingredients and "filler" charge;

(e) a circular chamber adapted for mixing solid asphalt additive using a full percentage of milled asphalt product to produce 100% recycled hot-mix mix asphalt; in a quantity of up to 750 (seven hundred and fifty) tons per hour; and, (f) a circular chamber adapted for mixing cold ingredients, "filler" charge and hot liquid asphalt in order to produce hot-mix asphalt, in a quantity of up to 750 (seven hundred and fifty) tons per hour.

In a preferred embodiment of the plant, the circular chamber for heating, drying and mixing is adapted to receive the milled asphalt product having a size of up to 100 mm.

In a preferred embodiment of the plant, the circular chamber for heating, drying and mixing is adapted to receive the cold ingredients and the "filler" charge.

In a preferred embodiment of the plant, the milled asphalt product is carried over to the circular chamber for heating, drying and mixing by means of the conveyor belt for granular milled asphalt product, in the form of chunks or pieces with sizes of up to 100 mm.

In a preferred embodiment of the plant, the cold ingredients are carried over to the circular chamber for heating, drying and mixing by means of the conveyor belt for cold ingredients with size of up to 75 mm.

In a preferred embodiment of the plant, there are a plurality of baffles provided slantwise (inclined), adapted to capture and retain the particles of soot and dust held in suspension.

In a preferred embodiment of the plant, the milled asphalt product cannot be mixed with the cold ingredients, and these materials are admitted separately by means of hoppers in which when one is opened the other is automatically closed.

In a preferred embodiment of the plant, the exhaust of the dusty particles and soot, lifted into suspension upon heating and drying, is naturally transported from the circular chamber to the baffles and the air purifying filter elements.

In a preferred embodiment of the plant, the circular chamber is adapted to receive the granular milled asphalt product, in the form of chunks or pieces with sizes of up to 100 mm and solid asphalt additive for producing 100% (one hundred percent), "original" mix.

In a preferred embodiment of the plant, the circular chamber is adapted to receive liquid asphalt cement and cold ingredients with size of up to 75 mm with the "filler" charge to produce a first grade hot-mix asphalt.

In a preferred embodiment of the plant, the circular chamber has a circular coil secured to the lower and side part that is heated by electrical resistors or gas-fueled heaters connected with the combined solar thermal energy module in order to produce thermal energy in the form of heat for heating, drying and mixing the milled asphalt product or cold ingredients. The electrical resistors or the gas heating nozzles can also be secured to the lower and side portions of the apparatus.

In a preferred embodiment of the plant, the same further comprises a system with a heat exchanger to cool the vapor and gas that leave the flue through two circular coiled pipes, that act as heat reducers, provided within the circular chamber, serving to preheat the cold ingredients kept in the cold feed silo/tank that comprises the following:

(a) a first tubular coil provided next to the mixing shafts and adapted to receive the heat generated in the circular chamber to produce hot-mix asphalt;

(b) a second tubular coil provided next to the filter elements and adapted to receive the heat that is output from the upper part of the air purifier filter; and, (c) an adequate piping with a pump for forced circulation of the thermal fluid or gas connected to the cold feed silo/tank and adapted with a cold ingredients grading sieve to preheat the same, reducing the amount of heat that is output from the flue.

One other object of the invention consists in the provision of a method of producing hot-mix asphalt using a full percentage of milled asphalt product and heating, drying and mixing the material using combined solar thermal energy (CSTE), characterized by comprising the steps of (a) providing a plant designed and built to produce hot-mix asphalt using a full percentage of milled asphalt product and heating, drying and mixing the material using combined solar thermal energy (CSTE), such asphalt plant comprising:

(1) a circular chamber adapted to receive the milled product and mix the same with solid asphalt additive or cold ingredients with the "filler" charge, at the speeds of 3.3 rpm; 6.6 rpm and 9.9 rpm;

(2) a tubular coil adapted to the circular chamber with electrical resistors or gas-fueled heaters that is connected to the combined solar thermal energy module panel for producing thermal energy in the form of heat, and for heating and drying the milled asphalt product or the cold ingredients and the "filler" charge;

(3) a combined solar thermal energy module panel adapted with a rectangular tubular coil with heating by sun radiation combined with electrical resistors or gas-fueled heaters to be automatically activated whenever there is no sunlight available; and, (4) a heat exchanger adapted with two pipe coils with thermal fluid or gas to preheat the cold ingredients and lower the temperature of the gases being emitted into the atmosphere;

(b) carrying the cold ingredients to the circular chamber;

(c) carrying the "filler" charge to the circular chamber;

(d) carrying the solid asphalt additive to the circular chamber;

(e) heating and drying the cold ingredients and the "filler" charge in the circular chamber;

(f) carrying the milled asphalt product to the circular chamber;

(g) mixing the milled asphalt product with solid asphalt additive to produce recycled hot-mix asphalt, in quantities of up to 750 (seven hundred and fifty) tons per hour; and, (h) mixing the cold ingredients, the "filler" charge, and the liquid asphalt cement to produce hot-mix asphalt, in quantities of up to 750 (seven hundred and fifty) tons per hour.

In a preferred embodiment, the method further comprises the steps of (i) stopping the operation of the asphalt pump if there occurs any ingress, into the chamber, of cold ingredients together with milled product. The pump is calibrated to produce first grade hot-mix asphalt or hot-mix asphalt using a full percentage of milled product;

(j) receiving the liquid asphalt cement having been weighed rather than measured in terms of mass flow (for enhanced precision, the calculation are performed on a product weight basis instead of a mass flow calculation); and, (k) awaiting for the necessary time in the circular chamber that the milled asphalt product be fully recycled without any presence of chunks, homogeneous and with no temperature variations; for example, the fine milled asphalt product evidencing a given temperature, the coarse milled asphalt product evidencing another temperature, without using a temperature rectifying means as those used for diesel oil—heavy oil or those used for a combination of heavy oil and gasoline.

In another preferred embodiment, the hot-mix asphalt plant is designed and built to produce hot-mix asphalt using a full percentage of milled product or hot-mix asphalt with cold ingredients, using combined solar thermal energy (CSTE), and further comprising: a circular chamber for heating, drying and mixing provided with a tubular coil secured to the lower side part that is heated by means of electrical resistors or gas-fueled heaters, such chamber heating system being connected to a combined solar thermal energy module panel which also operates with electrical resistors or gas-fueled heaters that are activated automatically whenever there is no sunlight available, where the said combined solar thermal energy module panel is useful to enhance the heating capability of the asphalt plant, where in the coils of the circular chamber and the combined solar thermal energy module panel there occurs a circulation of thermal fluid or gas for purposes of transfer of thermal energy in the form of heat for heating, drying and mixing the material using a full percentage of granular milled product, in chunks or pieces with sizes of up to 100 mm and solid asphalt additive for producing fully (100%) recycled hot-mix asphalt or for heating, drying and mixing cold ingredients with size of up to 75 mm, "filler" charge and liquid asphalt cement for producing first grade hot-mix asphalt, such method further comprising the steps of:

(l) carrying the cold ingredients from the cold feed silo/tank, using grading sieves and preheating the cold ingredients, into the circular chamber for heating, drying and mixing;

(m) carrying the milled asphalt product from the milled asphalt product silo/tank into the chamber for heating, drying and mixing;

(n) mixing the solid asphalt additive with milled asphalt product in sizes of up to 100 mm for producing a fully recycled hot-mix asphalt;

(o) mixing the cold ingredients with "filler" charge or fibers for producing hot-mix asphalt; and, (p) carrying the recycled hot-mix asphalt or first grade hot-mix asphalt into the hot-mix asphalt storage silos/tanks.

In another preferred embodiment of the method, the recycled hot-mix asphalt produced using the method has a final temperature that is equal to that of the heated and dried milled asphalt product and the final temperature of the hot-mix asphalt is higher than the temperature of the heated and dried cold ingredients.

In another preferred embodiment of the method, the milled asphalt product, with sizes of up to 100 mm is heated and dried without being mixed with overheated cold ingredients.

In another preferred embodiment of the method, the combination of milled asphalt product with sizes of up to 100 mm and the solid asphalt additive constitutes the entire percentage (100%) of material used to produce the recycled hot-mix asphalt.

In another preferred embodiment of the method, the plant used for producing hot-mix asphalt using a full percentage of milled asphalt product or for producing asphalt mix with cold ingredients using combined solar thermal energy further comprises the cooling of the vapor and gas produced in the circular chamber for heating, drying and mixing, where in order to be able to operate, the system used for cooling the temperature of the vapor and gas produced by the circular chamber for heating, drying and mixing cold ingredients in order to produce hot-mix asphalt comprises a first circular tubular coil filled with thermal fluid or gas, provided above the half-shafts used for heating, drying and mixing operations, which transfers heat from the mixture to this first coil that heats the sidewalls of a cold ingredients storage tank, provided with a grading sieve, to provide a degree of preheating and return of the material to the circular chamber using a centrifugal pump to return the same to the first coil provided near the outlet of the filter elements which purpose consists in withdrawing heat from the vapor and gas being let out into the atmosphere and transfer/recover such heat for preheating the cold ingredients, wherein the method further comprises the steps of:

(q) carrying the fluid heated at the source through tubular coils into the cold material receiving silo/tank for cold feed;

(r) reducing the temperature of the vapor and gas vented to the atmosphere; and, (s) preheating the cold ingredients to produce hot-mix asphalt.

In another preferred embodiment of the method, the same further comprises the step of:

(t) providing a fan for blowing the cooled vapor and gas from the circular chamber.

DETAILED DESCRIPTION OF VARIOUS
EMBODIMENTS OF THE INVENTION

There will be made reference, hereinafter, to the drawings and to the description of the preferred embodiments of the invention of a plant wherein is mixed solid asphalt additive, using a full percentage of milled asphalt product, for producing a fully recycled asphalt mix or mixing asphalt cement with cold ingredients and "filler" for producing first grade hot-mix asphalt using combined solar thermal energy for heating and drying the cold ingredients or for heating and drying milled asphalt product according to the present invention and as depicted in FIGS. 2 to 11. The preferred plant for mixing solid asphalt additive or liquid asphalt cement is capable of producing hot-mix asphalt using a full percentage (100%) of milled asphalt product. The hot asphalt plant employs a circular chamber for heating, drying and mixing granular milled asphalt product, in the form of chunks or pieces with a size of up to 100 mm.

In the preferred embodiments of the invention, the milled product does not need to be adjusted to different grades without compromising the quality of the recycled asphalt mix; the product may enter directly into the circular chamber for heating, drying and mixing, without compromising the quality of the recycled asphalt mix. It is contemplated within the scope of the invention that the milled product may be separated into different grades using any means as might be appropriate, although such separation is not strictly required.

Consequently, the milled product may be used in the preferred plant according to the invention, without requiring control of the size and quantity of the milled product in order to allow the production of fully recycled hot-mix asphalt, as there is obtained the same hot-mix asphalt formula of the milled asphalt paving that was previously present.

The circular chamber produces its output in the form of fixed batches, making use of two shafts provided orthogonally to one another and equipped with vanes that scrape the lower and side parts of the circular chamber as discussed below. There is contemplated within the scope of the present invention the use of any appropriate device, duly adapted to mix the milled product with a size of up to 100 mm with solid asphalt additive, for producing recycled hot-mix asphalt or cold ingredients with a size of up to 75 mm, "filler" charge and liquid asphalt cement in order to produce first grade hot-mix asphalt.

The scope of the invention also comprehends the provision of more shafts and more vanes in the circular chamber for heating, drying and mixing and for producing hot-mix asphalt having been recycled.

Figure 2:
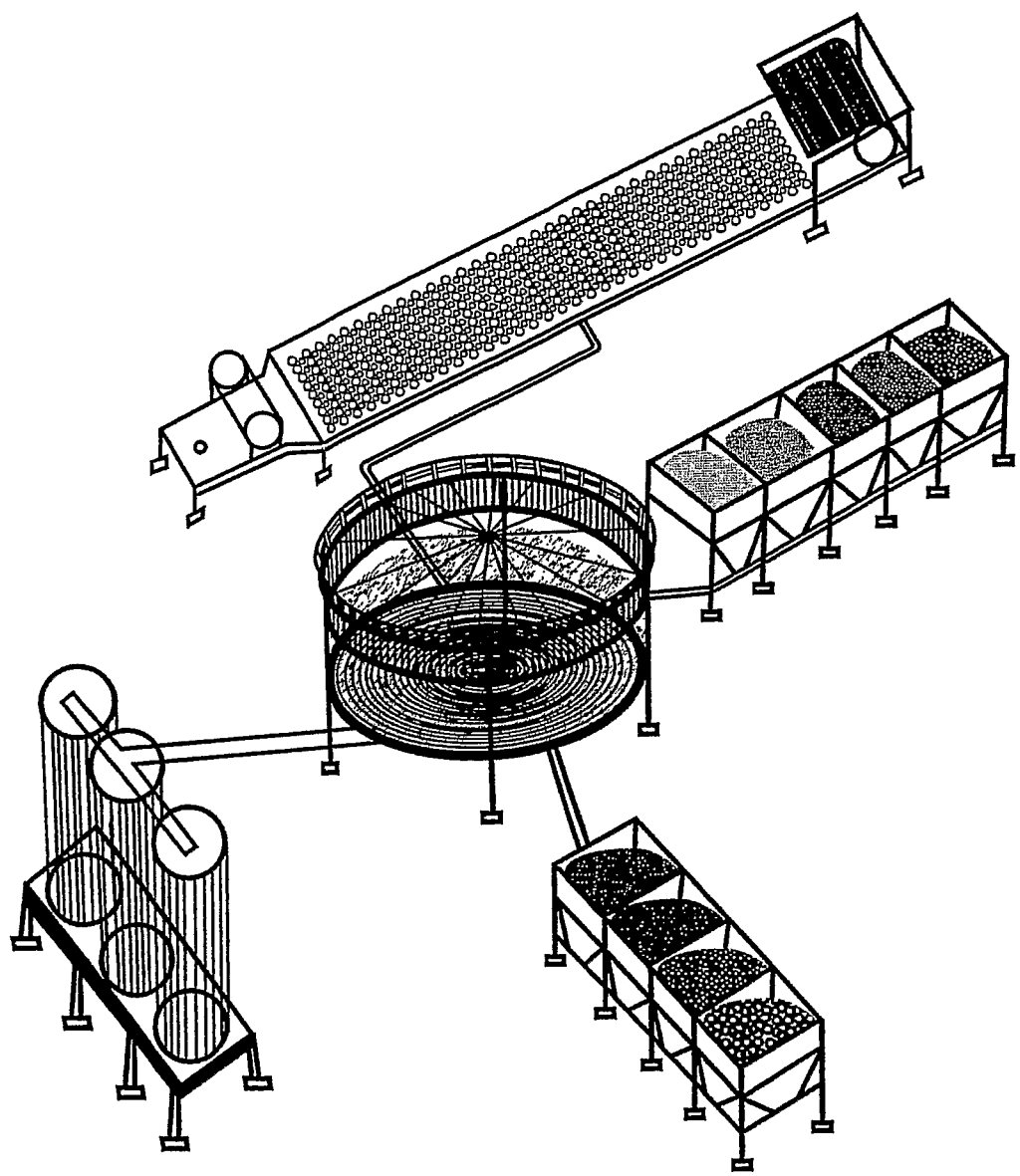
FIG. 2 is a perspective view showing an asphalt plant with the necessary apparatuses used to produce first grade hot-mix asphalt without using forced exhaust, fire, flames incident on the cold ingredients, the latter having a size of up to 75 mm, or to produce recycled hot-mix asphalt using a full percentage of granular milled product, in chunks or pieces with sizes of up to 100 mm.

FIG. 2 is a perspective view depicting the hot-mix asphalt plant; at the center of the image there is shown the circular chamber that provides drying, heating and mixing without using forced exhaust, direct flame on the cold ingredients, on the background there is shown the combined solar thermal energy module panel that operates in cooperation with the heating system of the circular chamber. In front of the circular chamber there is shown the milled asphalt product silo/tank with its conveyor, to the right side thereof there are shown the cold ingredients silos/tanks with a grading sieve, with preheating means and conveyor means; to the left side of the drawing there are depicted the silos/tanks for storage of hot-mix asphalt.

Figure 3:
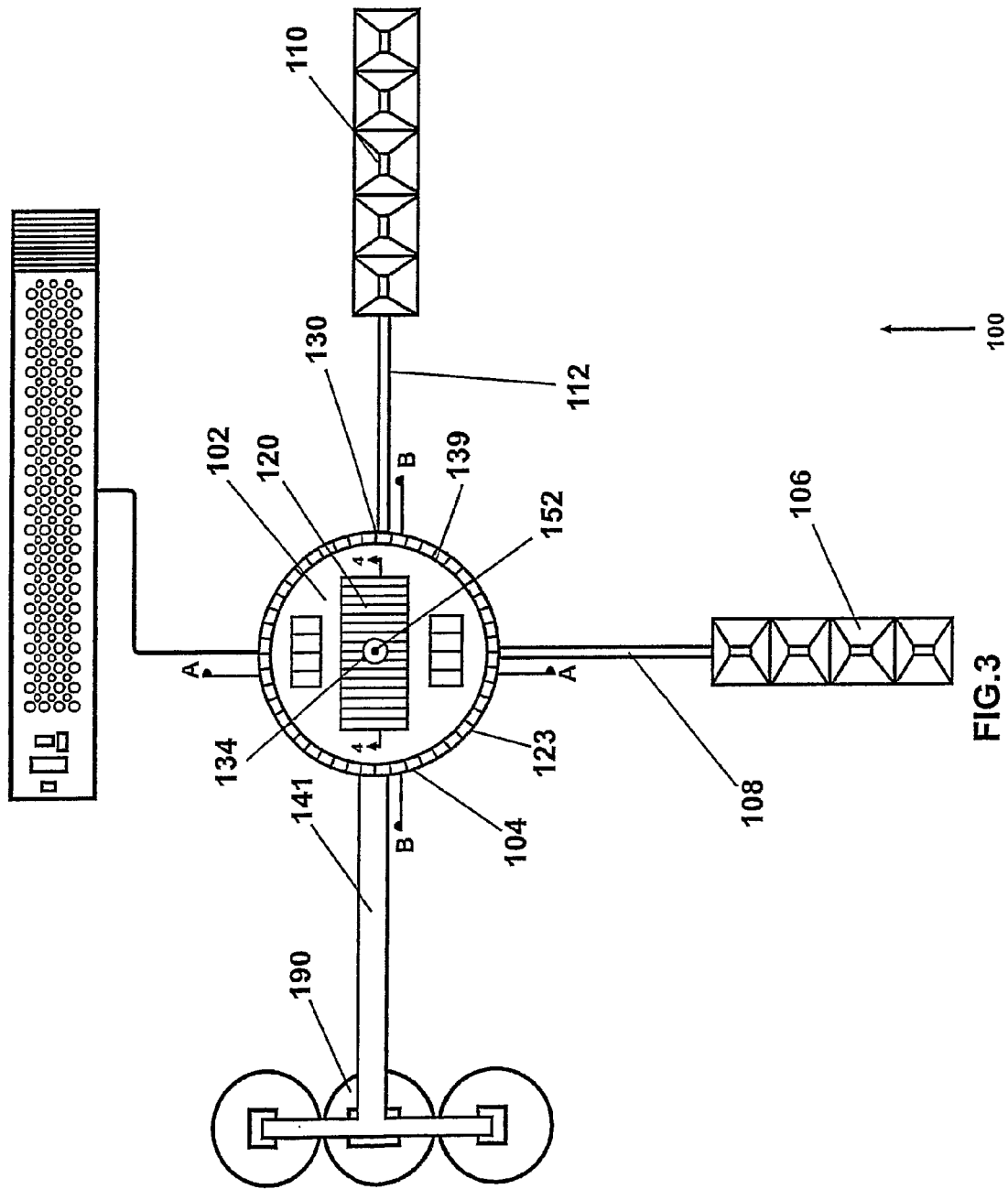
FIG. 3 is an upper sectional view of the asphalt plant with its apparatuses as required to produce the hot-mix asphalt according to the present invention.

Following the indications, FIG. 3 represents an asphalt plant 100 for mixing solid asphalt additive with milled product or liquid asphalt cement with cold ingredients and the respective apparatuses as required for producing first grade hot-mix asphalt or for heating and drying milled product using combined solar thermal energy for mixing solid asphalt additive using a full percentage (100%) of milled asphalt product with both a size and an amount similar to those of the asphalt paving wherefrom the milled product originated, for producing fully recycled hot-mix asphalt. The chamber used for heating, drying and mixing cold ingredients or milled asphalt product 102, with a tubular coil 104, with electrical resistors or gas-fueled heaters, is connected to the combined solar thermal energy (CSTE) module panel. Within the coil there circulates thermal fluid or gas. This coil is heated by means of electrical resistors or gas-fueled heaters that operate for heating, drying and mixing cold ingredients with liquid asphalt cement or milled product with solid asphalt additive in the circular chamber 102 for heating, drying, mixing and producing asphalt mix or fully recycled asphalt mix.

There is contemplated within the scope of the invention the provision of the necessary size for the preferred production capacity in each asphalt plant for mixing solid asphalt additive with a full percentage of milled product. The thermal heating tubular coil 104 is adapted to produce heat for heating and drying the variable rotation circular chamber 102. The preferred circular chamber is adapted to receive the milled product with a size of up to 100 mm for heating and drying the said milled product without mixing overheated cold ingredients with the milled product.

The milled asphalt products with sizes of up to 100 mm are carried from the milled asphalt product silo/tank 106 by means of the milled product conveyor belt 108 from the milled asphalt product for being mixed with solid asphalt additive in order to produce recycled hot-mix asphalt that is identical in all aspects to the formerly used (herein designated as "original") mix. The circular chamber 102 receives the milled product for heating and drying the same with its own heating means (rather than mixing the product with overheated cold ingredients) which causes lesser smoke production by the milled product, particularly regarding the fine particles thereof of approximately 1.6 mm in size, which are the particles of the milled product that produce the greater amount of smoke when heated, based on the high ratio of their surface area to the volume of the said material. Furthermore, when the fine milled product is producing smoke, the asphalt cement contained in the fines of the milled product is separated, burned, and produces hazardous emissions that compromise the quality and the production of the recycled hot-mix asphalt.

The preferred plant according to the invention does not allow that the milled product be mixed with the overheated cold ingredients and be thereby subjected to uncontrolled temperatures, which would entirely compromise the quality of the recycled hot-mix asphalt mixture, a fact that is not explained herein but of which a technician skilled in the art will be well aware. The milled product intended to be recycled must be normally heated. The milled product cannot be recycled with varying temperatures.

Still examining FIG. 3, the preferred circular chamber 102 is adapted to also receive the cold ingredients with a size of up to 75 mm, for heating and drying the cold ingredients in order to produce first grade hot-mix asphalt. The circular chamber for milled product or cold ingredients 102 receives the cold ingredients through the upper side end of the chamber 102 by way of the gate 130, and the cold ingredients received in the chamber through the gate 130 are heated and dried.

The heating is provided by means of combined solar thermal and electrical energy with a coil for thermal fluid or gas 104 at the lower side part of the circular chamber and electrical resistors 123 at the lower side part of the circular chamber, acting by heat conduction, with the heat being removed at the surface by the vanes 140, and by a combination of radiation and convection for heating and drying the cold ingredients or milled product in order to produce recycled hot-mix asphalt. In the tubular coils 104, the heating action is provided by heat transfer, by forced convection between the hot source and the cold target/receiver.

The cold ingredients are conveyed to the chamber 102 from the cold ingredients silos/tanks 110 by means of the conveyor belt 112. The chamber 102 is equipped with two shafts 125 provided perpendicularly to one another, comprising mixing and conveying vanes 140, located inside the circular chamber to provide the mixture of the cold ingredients with the liquid asphalt cement in order to produce the first grade hot-mix asphalt or to mix solid asphalt additive with milled product in order to produce fully recycled hot-mix asphalt.

The purifier filter is adapted to capture the dust produced by the heating and drying of the hot-mix asphalt. In the preferred embodiments there is no need of an endless screw auger nor a cyclone device with horizontal or vertical separator, nor is there any need of a fines recovery valve, since the particulate dust is deposited on the mixture by gravity within the circular chamber 102 without requiring any means of mechanical return whatsoever, using the gravity-driven pre-separator.

The combined solar thermal energy (CSTE) for the production of hot-mix asphalt affords the greatest possible yield in terms of percentage, proportionally to the use thereof as an alternative energy source, for example, the asphalt paving work cannot be performed under rainy conditions.

Figure 4:
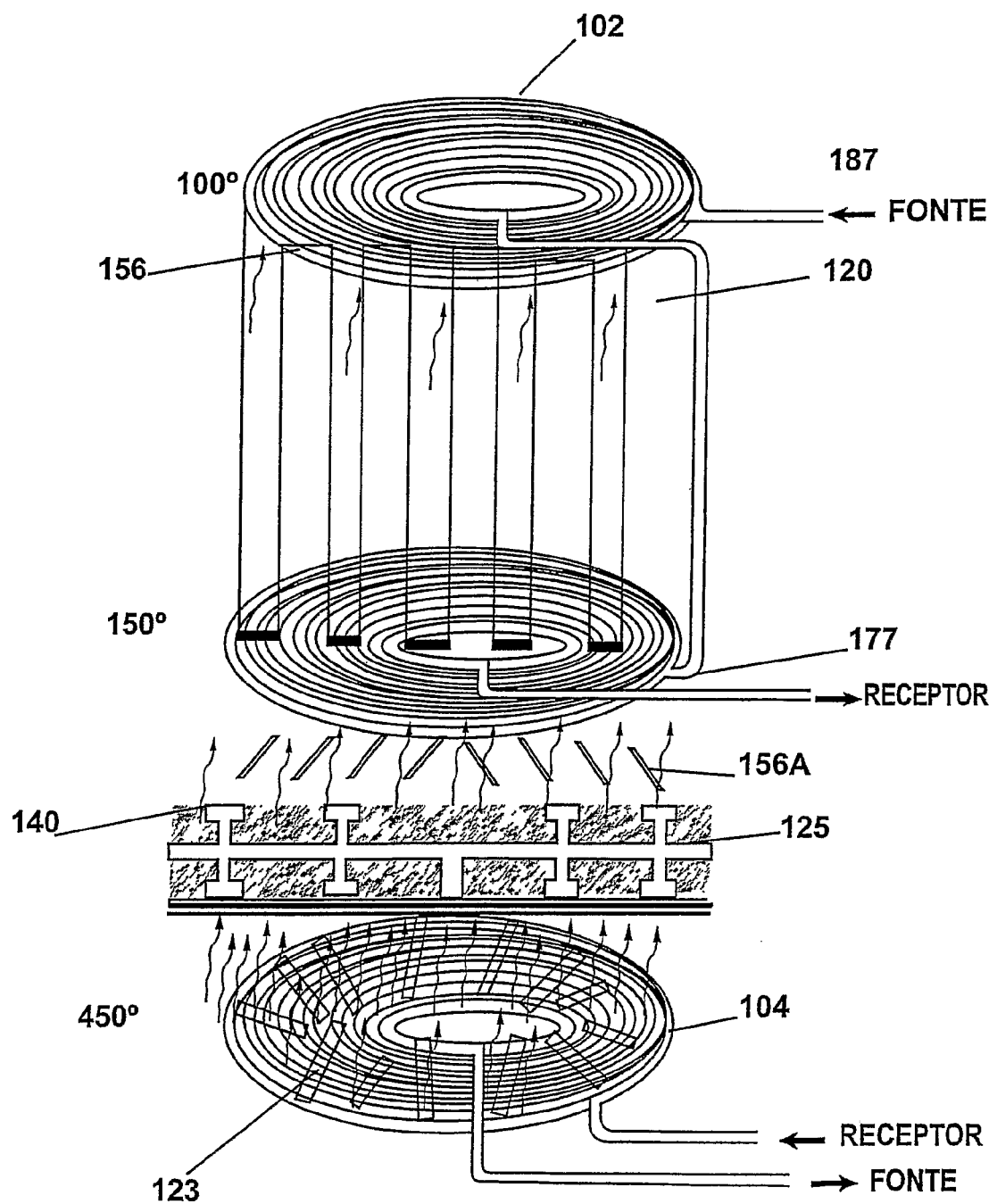
FIG. 4 is a partial sectional view of the circular chamber with the preferred air purifier filter used in connection with the asphalt plant, taken along the line 4-4 depicted in FIG. 3.

Now examining FIG. 4, there is shown therein a partial view of the circular chamber 102 with the heat exchanger coil 177 and the coil 178 and the preferred filter 120, which is adapted to filter out the dust and particles of milled product that rise in suspension above the mix when the same is produced and are unable to pass through the filter elements, and are decanted, returning by gravity onto the hot-mix asphalt without any need of mechanical return means. While the dust and particulate matter retained in the filter 120 return by gravity, the hot-mix asphalt has more time to be produced adequately. The particles, to wit, dust coated milled product, do not adhere to the chamber by virtue of the permanent heating at the bottom and the sidewall of the circular chamber 102.

Between the rotary shafts 125 and the tubular coil 177 there are a plurality of elements 156A intended to retain the particulate matter in suspension and provide the return thereof to the process of production of the hot-mix asphalt.

Particularly, the fan 152 produces an air flow at the upper part of the filter 120 to cause the filtered gas to exit the process by way of the flue 134.

The preferred chamber 102 according to the invention allows the clean filtered gases produced for heating and drying the cold ingredients or milled product to have their temperature lowered on leaving through the flue into the atmosphere since there is not made use of combustion of fossil fuels, which would jeopardize the quality of the hot-mix asphalt and would contribute to worsening the problem of global warming. The same preference is also given to the lower tubular coil 177 and the upper tubular coil 187, that transfer thermal energy in the form of heat arising from the hot gases leaving the rotary shafts and the hot gases leaving the filter elements, respectively, to the thermal fluid that will preheat the cold ingredients, thereby cooling the gases that exit by way of the flue 134, and simultaneously preheating the cold feed silo/tank 110.

Still referring to FIG. 4, there is shown therein a partial cross-sectional view of the circular chamber 102 and the air purifier filter 120. According to the indications in FIG. 4, the preferred filter 120 is adapted to retain the particles, dust and soot, lifted in suspension, for heating and drying the cold ingredients or the milled asphalt product and make them return, by gravity, to the process of production of hot-mix asphalt, using the gravity-type pre-separator The preferred filter 120 further includes an annular space 156 wherein are contained the filtering elements. The preferred annular space 156 is adapted to retain the particulate matter lifted while heating and drying the cold ingredients or the milled asphalt product. The chamber for heating, drying and mixing 102 further comprises a gate 160 through which the hot-mix asphalt exits upon being finished. The preferred hot-mix asphalt plant according to the invention includes the lowering of the temperature of the gases emitted to the atmosphere using a dedicated silo/tank, equipped with a high-frequency sieve within the silo/tank for grading the cold ingredients. It is contemplated within the scope of the invention, however, that the cold ingredients might possibly be separated into different sizes using any means as may be appropriate. This silo/tank receives thermal energy in the form of heat originating from two tubular coils that provide heat exchange. The first coil 177 is secured over the rotary shafts and vanes and the second coil 178 is secured over the outlet from the filter elements for transferring a part of the said heat to the sidewalls of the cold feed silo/tank 110 in order to preheat the same and lower the temperature of the gases at the outlet from the flue 152.

Figure 5:
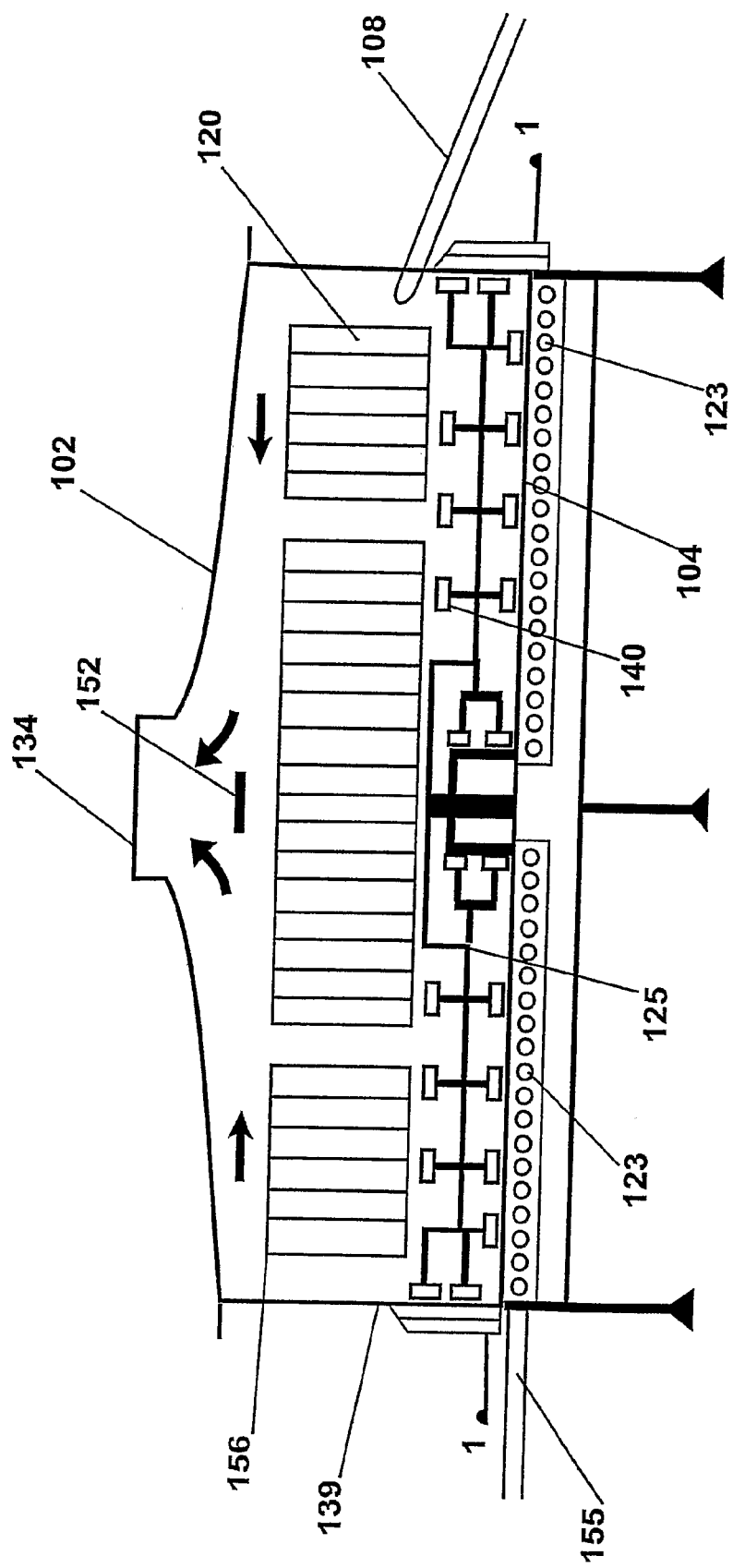
FIG. 5 is a partial sectional view taken along the line A-A in a part of FIG. 3.

Referring now to FIG. 5, there is depicted therein a partial cross-sectional view taken along the line A-A of FIG. 3. As shown in FIG. 5, the hot asphalt plant 100 is provided for mixing cold ingredients or milled asphalt product in the chamber 102 and the coil 104 is provided with piping 155 for thermal fluid or gas circulation which connects the plant to the combined solar thermal energy module panel with electrical resistors or gas-fueled heaters. The combined solar thermal energy (CSTE) module panel is provided with a plurality of focusing lenses that output thermal energy in the form of heat for heating a tubular coil with rectangular cross section of the said panel and for transferring thermal energy in the form of heat to the thermal fluid or gas. Attached to the cited tubular coil with rectangular cross section there are provided electrical resistors or LPG-fueled or natural gas-fueled heaters that operate by heating the said coil automatically whenever there is no sunlight available, thereby substituting, partially or entirely, the heat generated by the sun rays through the focuses of the converging lenses and/or solar-thermal cylinders. This thermal fluid or gas is pumped to the other tubular circular coil that is attached to the lower side part of the circular chamber of the asphalt plant, which is also provided with electrical resistors or gas-fueled heaters next to the said tubular circular coil at the lower side part of the circular chamber to operate automatically whenever there is no sunlight available. The combined solar thermal energy module panel contributes to enhance the thermal energy generation capacity of the asphalt plant. The present system basically operates in the following manner: firstly by solar thermal radiation by means of the focusing of the sun rays that cross the converging lenses, provided in the form of a large number of units and that transfer thermal energy in the form of heat by convection between the hot source and the source that does not receive solar energy (in the circular chamber there are electrical resistors or gas-fueled heaters as the sole alternatives). The outer wall of the hotter circular coil heats by thermal conduction the wall of the colder piping that is in contact with the thermal fluid or gas such that the same may receive thermal energy in the form of heat to be supplied to the circular chamber for heating and drying the cold ingredients in order to produce first-grade hot-mix asphalt or hot-mix asphalt using a full percentage of milled product.

Figure 8:
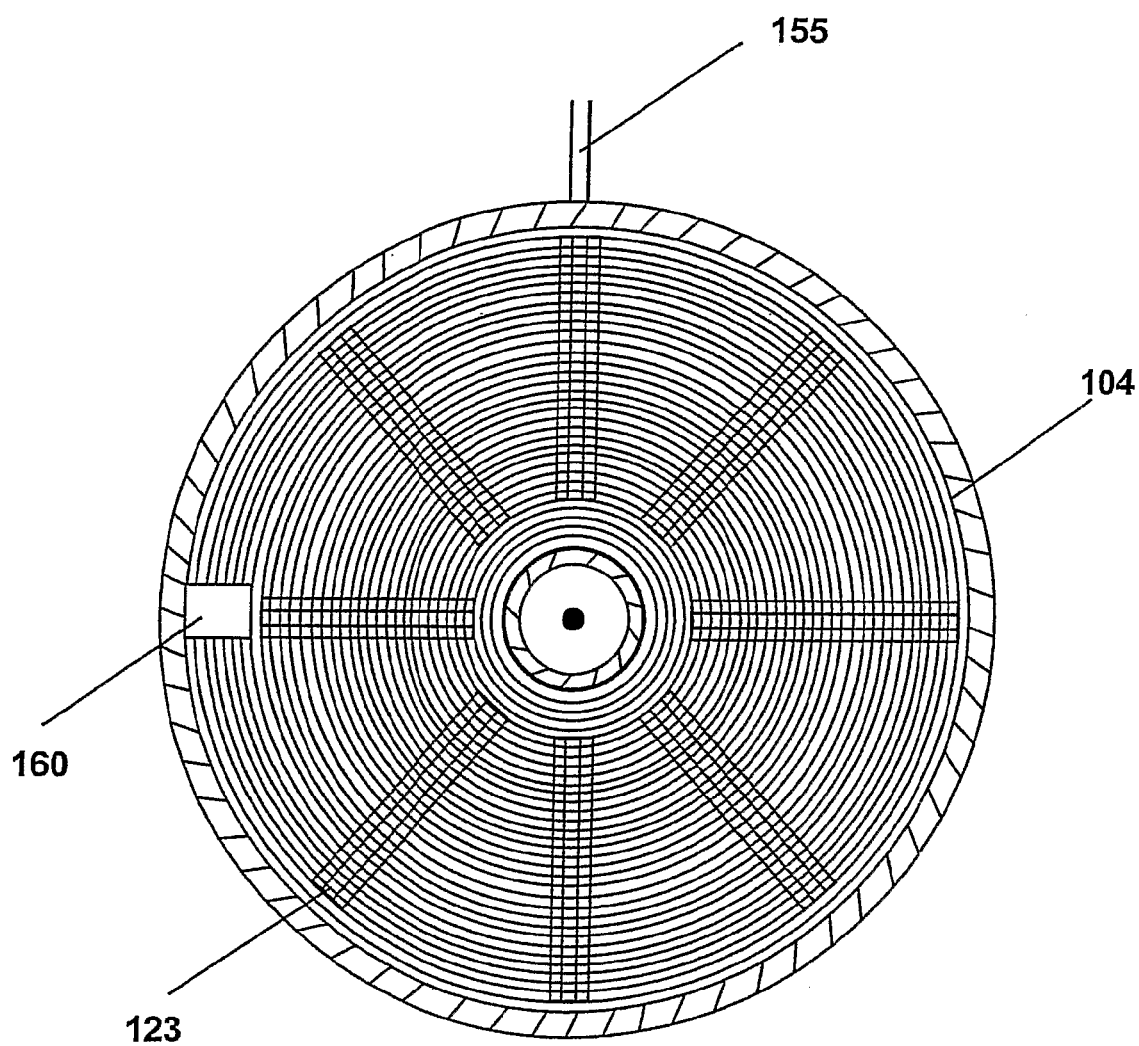
FIG. 8 is a partial sectional view, taken along the line 1-1 of FIG. 5.

Referring now to FIG. 8, there is shown therein a partial cross-sectional view taken along the line 1-1 of FIG. 5, wherein is depicted the circular tubular coil 104 with electrical resistors 123 or gas-fueled heaters with the outlet 155 for the thermal fluid or gas piping leading to the combined solar thermal energy module panel.

Figure 6:
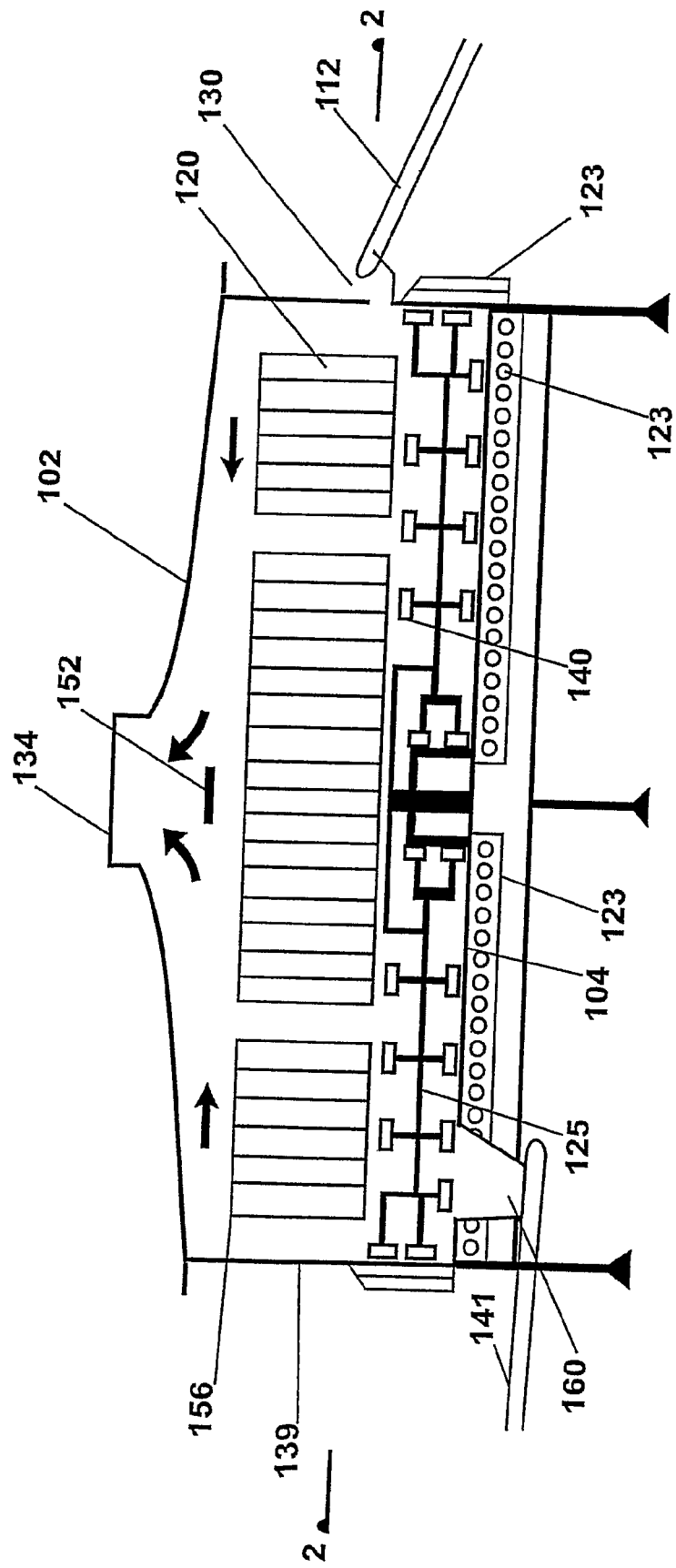
FIG. 6 is a partial sectional view taken along the line B-B in a part of FIG. 3.

Referring now to FIG. 6, there is shown therein a partial cross-sectional view taken along the line B-B of FIG. 3. According to the illustration of FIG. 6, the hot-mix asphalt plant includes the chamber 102 with combined solar thermal heating where the coil is heated by convection, the plate is heated by conduction, transferring radiation and convection by means of the surface when the vanes scrape the bottom plate and the side wall at sufficient height for heating and drying the cold ingredients or the milled product, showing the shaft for heating, drying and mixing 125 coupled to the adequate vertical drive shaft 116 with variable angular velocity of rotation, to wit, 3.3 rpm for heating and drying the cold ingredients with size of up to 75 mm or granular milled product, in the form of chunks or in pieces with a size of up to 100 mm; a velocity of 6.6 rpm for mixing with liquid asphalt cement or solid asphalt additive; and a velocity of 9.9 rpm to provide the exit of the finished mixture through the gate 160 over the drag conveyor for the hot-mix asphalt 141, to be discharged into the storage silos/tanks 190 (not shown). It is contemplated within the scope of the invention, however, that the finished hot-mix asphalt be carried from the chamber to the storage silo/tank using any means as may be appropriate. Further in the asphalt plant for hot-mix asphalt there are provided a plurality of baffles 156A in the circular chamber 102 for the purpose of making the dust return to the hot-mix asphalt.

Figure 9:
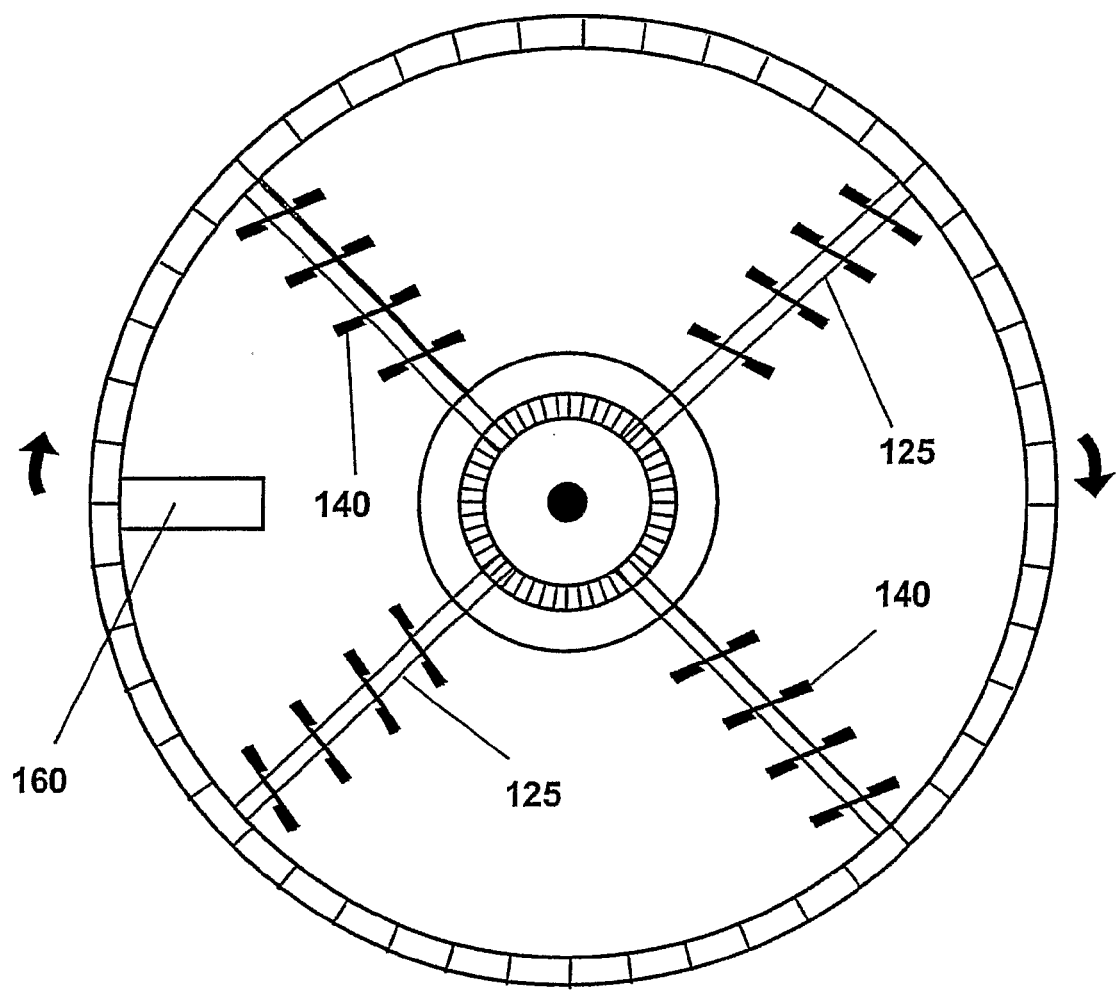
FIG. 9 is a partial sectional view, taken along line 2-2 of FIG. 6.

Referring now to FIG. 9, there is shown therein a partial cross-sectional view taken along the line 2-2 of FIG. 6, showing the rotary shaft 125 with the vanes 140 for heating, drying and mixing cold ingredients with liquid asphalt cement or a full percentage of milled product with solid asphalt additive for producing hot-mix asphalt that is output by way of the gate 160.

Figure 7:
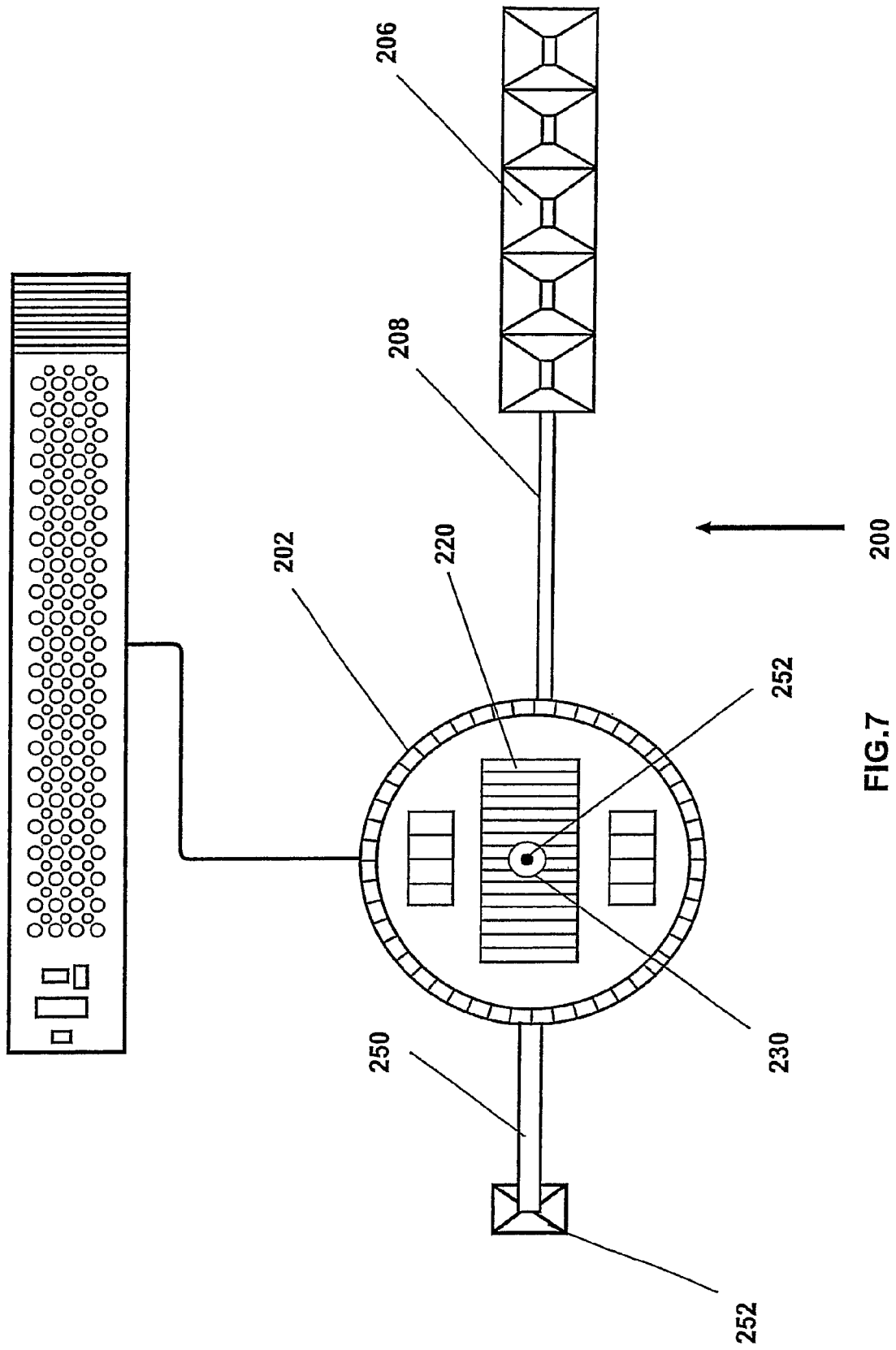
FIG. 7 is an upper partial sectional view of an alternative embodiment for an asphalt plant intended for producing first grade hot-mix asphalt or recycled hot-mix asphalt using a full percentage of milled product (100%).

Referring now to FIG. 7, there is illustrated therein a partial upper cross-sectional view of an alternative embodiment of the asphalt plant 200 for producing hot-mix asphalt, FIG. 7 now represents a second simplified alternative 200 wherein, in addition to the inexistence of four milled product silos/tanks, there also is no conveyor belt for milled product. In this alternative embodiment, the milled product makes use of the same conveyor belt used for the cold ingredients 208 as well as two milled product silos/tanks and three silos/tanks used for cold ingredients. This is possible due to the fact that the preferred plant according to the invention does not allow the processing of partially recycled hot-mix asphalt, that is, it either processes first grade hot-mix asphalt or processes fully recycled hot-mix asphalt. The plant was designed and built to produce, separately, first grade hot-mix asphalt or hot-mix asphalt using a full percentage of milled product. In the present simplified alternative embodiment, there are no silos/tanks for storing hot-mix asphalt. The latter is stored in the asphalt plant itself by means of dynamic storage and constant heating until it is discharged in the hopper of the drag elevator to be thereafter discharged into the dumper trucks. The simplified alternative embodiment maintains the same combined solar thermal energy (CSTE) module panel that cooperates with the heating system of the asphalt plant, there being merely reduced in this case the produced amount of first grade hot-mix asphalt or hot-mix asphalt with full percentage of milled product. However, the alternative hot-mix asphalt plant embodiment 200 includes a circular chamber for heating, drying and mixing 202 that is adapted to receive the milled product from the silo/tank 206 or to receive cold ingredients from the same silo/tank 206 since the alternative plant 200 includes this possibility. The plant works producing only first grade hot-mix asphalt or fully recycled hot-mix asphalt using the same conveyor belt 208, used for milled product or for cold ingredients, depending on which hot-mix asphalt is intended to be produced. The clean gases from the purifier filter 220 exit naturally in a less heated condition through the flue 230 into the atmosphere. Still referring to FIG. 7, in the alternative hot-mix asphalt plant 200, the heated and dried cold ingredients or milled product do not need to be carried to the chamber 202 since they are already within the same. The hot-mix asphalt is carried from the chamber 202 by the drag elevator 250 into the discharge silo/tank 252. The alternative hot-mix asphalt plant 200 includes a gravity-driven return system for the particulate material in suspension, dust and soot, that separate from the cold ingredients or from the milled product at the time of heating and drying thereof for producing the hot-mix asphalt.

The alternative hot-mix asphalt plant 200 is also different from the hot-mix asphalt plant 100. For example, the silo/tank and the feed path for the milled product in the alternative plant 200 are the same used for the cold ingredients, thereby saving space in the facility without compromising the quality of the hot-mix asphalt. It should be pointed out that in the alternative hot-mix asphalt plant 200 there is no silo/tank for storage of the hot-mix asphalt. The hot-mix asphalt is carried by the drag elevator 250 to the silo/tank 252.

Figure 10:
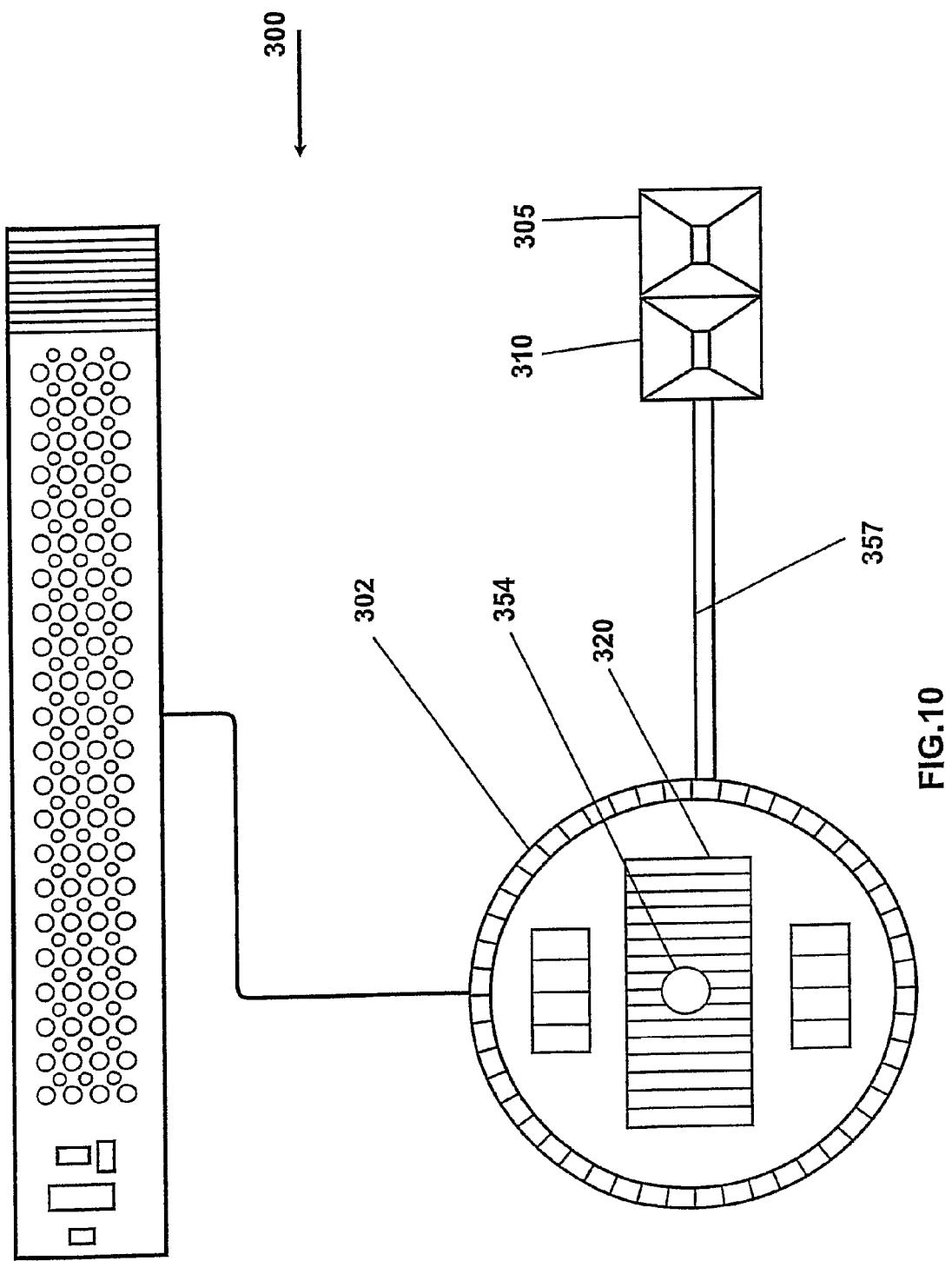
FIG. 10 is an upper partial sectional view of an alternative embodiment, further simplified, for an asphalt plant according to the present invention.
Figure 11:
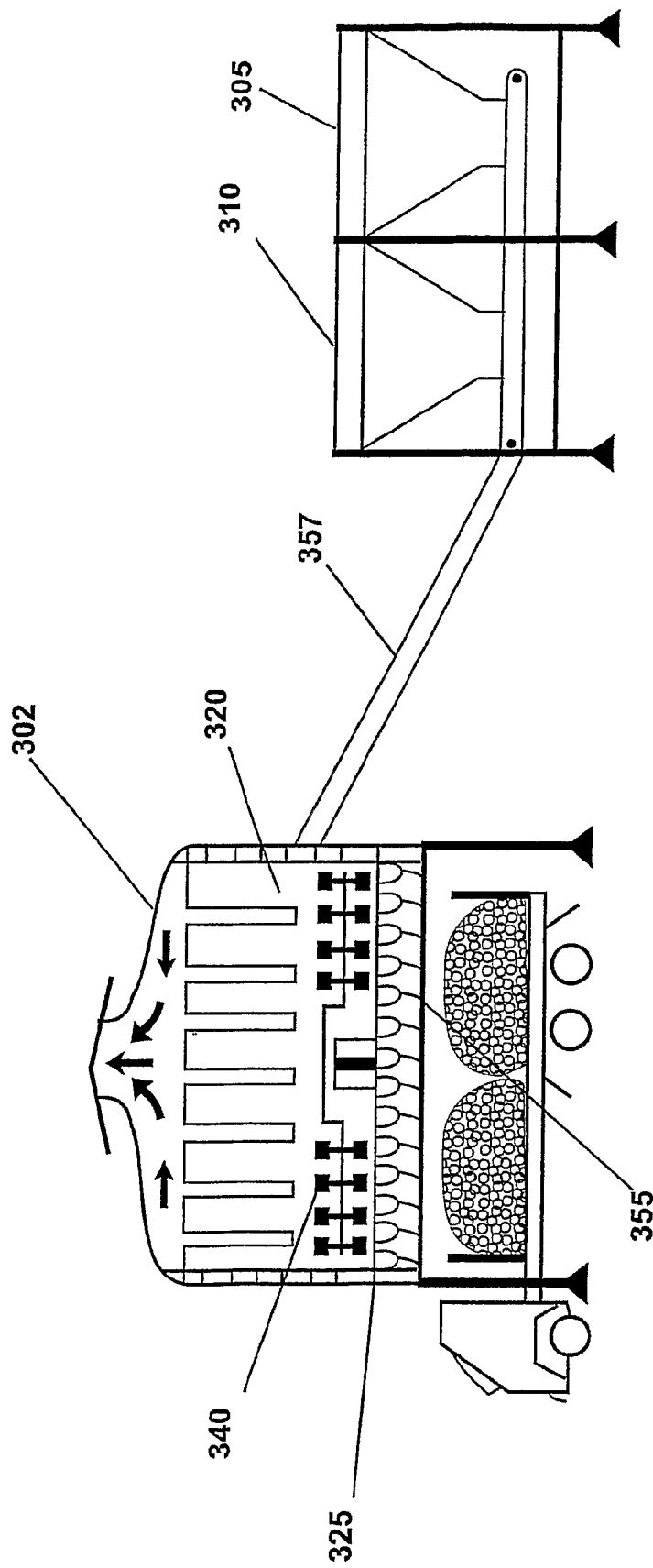
FIG. 11 is a partial sectional view taken along the centerline of the alternative embodiment, further simplified, of the asphalt plant and the cold ingredients tank with preheating and high-frequency grading sieve means.

Referring now to FIG. 10, there is depicted therein a partial cross-sectional view of an alternative situation, still more simplified. FIG. 10 represents a third alternative 300, still more simplified, wherein in addition to the inexistence of a drag elevator for the finished hot-mix asphalt, the plant is smaller, has only two silos/tanks, one silo/tank for cold ingredients 305, and another silo/tank for milled product 310. The cold ingredients or the milled product is received in the circular chamber 302 by means of the conveyor belt 357 which carries whatever is selected to produce whatever hot-mix asphalt is intended to be obtained. The alternative asphalt plant 300 does not have a bucket elevator for transporting hot ingredients, does not have a grading sieve to grade the hot ingredients, does not have a metering tank for weighing hot ingredients, thereby enabling the plant to stand at a lower height in relation to the towers of the conventional gravity-feed plants. In this preferred alternative plant 300 according to the invention, the loading is performed beneath the asphalt plant, in the trucks. The alternative embodiment 300 is designed and built for plants with a radius of up to 3.50 meters. There is also provided a reduction of the size of the combined solar energy module panel as previously explained to cooperate with the heating system of the alternative asphalt plant 300. In the third alternative the hot-mix asphalt leaves through two gates 355 as shown in FIG. 11, at the lower part of the asphalt plant, directly into the dumper trucks, or remains stored in the plant itself.

The present invention further comprises a method of producing hot-mix asphalt using a full percentage of milled product and of producing first grade hot-mix asphalt by heating and drying the cold ingredients using combined solar thermal energy (CSTE).

The preferred method of the invention comprises the provision of a plant for mixing solid asphalt additive that is not an adapted facility but is instead designed and built for recycling using a full amount of milled asphalt product and for producing first grade hot-mix asphalt by heating and drying the cold ingredients using combined solar thermal energy.

The preferred plant includes a circular chamber that combines the functions of drying and mixing that are carried out within the same container using a plurality of operating speeds, to wit, 3.3 rpm for heating and drying the cold ingredients or the milled product; 6.6 rpm for mixing the cold ingredients or milled product with liquid asphalt cement for producing first grade hot-mix asphalt without using forced exhaust nor applying fire or a flame to the cold ingredients or for mixing solid asphalt additive in order to produce fully recycled hot-mix asphalt, and 9.9 rpm to output the finished hot-mix asphalt.

In the preferred embodiments according to the invention, the method further comprises the step of setting up a hot-mix asphalt plant equipped with a purifier filter coupled to the circular chamber for heating, drying and mixing which filter is adapted to filter out the particulate dust lifted while heating and drying the cold ingredients or the milled product, such dust returning to the process by gravity, being thereupon incorporated into the first grade hot-mix asphalt or fully recycled hot-mix asphalt.

In order to move the clean, filtered gases from the heating and drying of the mixture, there is adapted a fan blower to the upper part of the filter. In addition to the preferred system for gravity-driven return of the particulate matter in suspension, such as dust and soot, there are also included a plurality of baffle plates adapted such that all particulate dust having been produced may be returned thereby to the circular chamber for heating, drying and mixing.

The preferred method further includes the step of addition of the liquid asphalt cement (LAC) to the cold ingredients and solid asphalt additive to the milled asphalt product in the circular chamber for heating, drying and mixing. The chamber also transports the hot-mix asphalt or the fully recycled hot-mix asphalt to a drag conveyor for hot-mix asphalt by way of a hopper secured to the circular chamber.

The preferred drag conveyor then carries the hot-mix asphalt to a hot-mix asphalt silo/tank. The preferred method also includes the step of carrying the particulate dust, the soot and the coated particles of milled product from the baffle plates, by gravity, to incorporate the same into the hot-mix asphalt or the asphalt mix with full percentage of milled product. The preferred method further includes the step of moving the clean filtered gas using a fan blower. Various advantages of the preferred embodiments of the invention are achieved. For example, in the preferred embodiments of the device and method for a plant for mixing solid asphalt additive using a full percentage of milled product or mixing liquid asphalt cement with cold ingredients and "filler" charge for producing first grade hot-mix asphalt using combined solar thermal energy, the milled asphalt product does not need to be classified, graded, it may be provided in sizes of up to 100 mm and may then be introduced into the circular chamber for heating, drying and mixing with solid asphalt additive and produce the fully (100%) recycled hot-mix asphalt, and the production of smoke and other harmful emissions caused by the heating and drying of the milled product is diminished. The milled product is not mixed with the overheated cold ingredients (as opposed to what occurs in conventional plants), as the temperature thereof is gradually raised until reaching the minimum temperature required for the process. The provision of the milled product in sizes of up to 100 mm also affords better control over the characteristics of the recycled hot-mix asphalt produced by the plant without the need to control the grading and proportions of the milled product since the process recycles the hot-mix asphalt wherefrom the milled paving asphalt originated, irrespective of proportions or grades.

The preferred embodiments also do not allow that the existing particles of dust or soot of the cold ingredients or of the milled product be carried over the air, and further eliminates any sticking of the hot-mix asphalt to the plant since the circular chamber for heating, drying and mixing is constantly heated by a tubular coil filled with thermal fluid or gas at the lower side part of the plant.

The plant is provided with drive means using a manually operated hydraulic pump to allow the withdrawal of the finished hot-mix asphalt or to finish the same whenever there occurs a power outage, a stoppage, a breakage, etc. The circular chamber is lined at the bottom and sidewall with wear-resistant plate material. The heating of the lower part and the sidewall of the circular chamber is provided by conduction through the plate, and it is removed by the vanes on the surface thereof by a combination of radiation and convection. The thermal fluid is heated by forced convection.

Regarding the preferred system according to the invention for cooling the vapor and gas output in the production of hot-mix asphalt and recycled hot-mix asphalt that are emitted to the atmosphere, the system is described and illustrated comprising two coils for cooling the vapor and gases. It is contemplated in the scope of the invention the provision, at will, of more vapor and gas cooling coils to operate in the process of production of first grade hot-mix asphalt or fully recycled hot-mix asphalt.

Referring to FIG. 4, there is depicted therein a partial cross-sectional view of the circular chamber, showing the tubular cooling coils. As indicated in FIG. 4, the preferred lower coil is adapted to receive the thermal fluid having been heated by forced convection, and transfers this heat by conduction to the side walls of the cold ingredients tank in order to provide a measure of preheating of the cold ingredients by radiation and convection through these side walls, and includes the return of the thermal fluid to the circular chamber for heating, drying and mixing, wherein is adapted the second tubular cooling coil next to the filter elements for cooling the vapor and gas that pass therethrough, causing the heating of the thermal fluid and continuing to the first coil wherefrom there is transferred thermal energy in the form of heat, by convection, in order to once again transfer heat by conduction in the inner plate, transferring thermal energy by radiation and convection through the outer plate to the cold ingredients present in the cold feed to preheat the same.

There will be presented in the following two examples of production, respectively of first grade hot-mix asphalt and of production of fully (100%) recycled hot-mix asphalt, using the process according to the present invention.

Firstly, in an example of production of first grade hot-mix asphalt, the circular plant is turned on and starts to spin its rotating arms at a first speed of 3.3 rpm, which is used for heating and drying the cold ingredients that make up the mixture intended to be produced. The process proceeds until reaching a temperature of 400° C., at which time the conveyor belt starts to load the circular plant, in accordance with the specific formula intended according to the project, which serves to replace concrete slabs, of either conventional or reinforced concrete, of rigid type paving sections evidencing problems. The sieving parameters of that first grade mixture are illustrated in Table 1 below:

TABLE 1

| FORMULA BY WEIGHT | | | |
|---|---|---|---|
| SIEVES (mm) | RETAINED PERCENTAGE | ACCUMULATED PERCENTAGE | PASSED PERCENTAGE |
| 76.2 | 0 | 0 | 100 |
| 63.5 | 10 | 10 | 90 |
| 50.8 | 15 | 25 | 75 |
| 38.1 | 9 | 34 | 66 |
| 25.4 | 11 | 45 | 55 |
| 19.1 | 10 | 55 | 45 |
| 9.5 | 5 | 60 | 40 |
| 4.8 | 3 | 63 | 37 |
| 2 | 2 | 65 | 35 |
| 1.2 | 4 | 69 | 31 |
| 0.6 | 3 | 72 | 28 |
| 0.42 | 10 | 82 | 18 |
| 0.3 | 8 | 90 | 10 |
| 0.15 | 7 | 97 | 3 |
| 0.074 | 3 | 100 | 0 |

Plus the addition of 6.5% of asphalt cement improved with polymers in a range of 3 to 6%.

The loading of the circular plant of the present invention always starts in increasing order of size, with the cold ingredients of smaller size, followed by the cold ingredients of larger size. After this loading, which will be proportional to the size of the circular plant to be used, i.e., smaller plants will be used for smaller production scale and larger circular plants will be used for larger production scale, limited to 750 tons per hour, there is awaited until the dry mixture of the cold ingredients reaches a temperature of between 150° C. and 160° C., which normally occurs within a term of 25 to 30 minutes (dry mixing). At this point, there is added the conventional liquid asphalt cement or the liquid asphalt cement improved with polymers within a range of 3% to 6%, at a temperature within the range of from 165° C. to 175° C., whereby the first grade hot-mix asphalt will be ready, in individual batches of up to 750 tons per hour, at a temperature of between 160° C. and 165° C. After ten minutes of wet mixing, at a speed of 6.6 rpm, the first grade hot-mix asphalt leaves the circular plant, at that time being circulated at a speed of 9.9 rpm, with its adequate mechanical specifications, i.e., flexural modulus and resistance to traction superior to those evidenced by first grade hot-mix asphalt produced using conventional plants and processes, still without using, at any time, any forced exhaust and application of direct flame on the cold ingredients.

In the second example, which is intended for the production of a fully (100%) recycled hot-mix asphalt, using milled asphalt products in the form of chunks or granular forms, using the present hot recycling technique, the process is substantially similar to that which was described above in relation to the production of first grade hot-mix asphalt, merely substituting the formula used for the first grade hot-mix asphalt with the formula for fully (100%) recycled hot-mix asphalt, to wit: firstly, the circular plant is turned on and starts spinning its rotating arms at the first speed of 3.3 rpm, approximately, whereby are heated, dried and softened the asphalt products in the form of chunks and/or milled asphalt products, gradually until achieving the separation thereof, such products making up the recycled hot-mix asphalt that is intended to be fully (100%) recycled. After the circular plant reaches the temperature of 400° C. approximately, the loading conveyor belt starts to load the circular plant as specified in each intended formula according to the project of fully (100%) recycled hot-mix asphalt, which in this example will be prepared using as ingredients the milled asphalt products obtained from an existing paved source, comprised of cold ingredients classified in range "C" by the Brazilian Department of Transport Infrastructure ["Departamento Nacional de Infra-Estrutura de Transportes"—DNIT] and using a rubberized solid asphalt additive. The sieving of such fully recycled asphalt mix is shown in the Table 2 below:

TABLE 2

| FORMULA BY WEIGHT | | | |
|---|---|---|---|
| SIEVES (mm) | RETAINED PERCENTAGE | ACCUMULATED PERCENTAGE | PASSED PERCENTAGE |
| 2 | 0 | 0 | 100 |
| 1.2 | 25 | 25 | 75 |
| 0.6 | 26 | 51 | 49 |
| 0.42 | 17 | 68 | 32 |
| 0.3 | 13 | 81 | 19 |
| 0.15 | 11 | 92 | 8 |
| 0.074 | 8 | 100 | 0 |

Plus the addition of 15% of asphalt cement improved with polymers in a range of 4 to 6%.

The circular plant of the present invention is loaded with the milled asphalt products. After loading, this mixture is awaited to reach a temperature between 150° C. and 160° C., such that the fine milled asphalt product be separated from the coarse milled asphalt product, which normally occurs within a delay of 25 to 30 minutes, relative to the dry mixing. At this point, there is added solid rubberized asphalt additive according to the project specification, which in this example is 7 wt %, at ambient temperature, thereby being obtained the fully (100%) recycled hot-mix asphalt in the form of individual batches of up to 750 tons per hour (always bearing in mind that smaller circular plants will produce lesser amounts per hour of work than larger circular plants) at a temperature of between 160° C. and 165° C. After approximately ten minutes, corresponding to the time required for the solid rubberized asphalt additive to adequately mix with the milled asphalt products, which takes place at a rotary speed of 6.6 rpm, the fully recycled hot-mix asphalt leaves the circular plant, at the final speed of 9.9 rpm, evidencing all the adequate mechanical specifications, to wit: flexural modulus and resistance to traction equal to or superior to those of the hot-mix asphalt previously existing in the asphalt pavement prior to milling, without using cold ingredients, either or not overheated, of any kind, which establishes the distinction between the present process and any other process know to date.

The invention claimed is:

1. A method of producing hot-mix asphalt using a full percentage of milled asphalt product and heating, drying and mixing using combined solar thermal energy (CSTE), wherein said method comprises the steps of:
  (a) providing a plant designed and built to produce hot-mix asphalt using a full percentage of milled asphalt product and heating, drying and mixing a material using combined solar thermal energy (CSTE), the said asphalt plant comprising:
    (1) a circular chamber adapted to receive the milled product and mix the same with solid asphalt additive or cold ingredients with a "filler" charge, at the speeds of 3.3 rpm, 6.6 rpm and 9.9 rpm;
    (2) a tubular coil adapted to the circular chamber with electrical resistors or gas-fueled heaters that is connected to a combined solar thermal energy module panel for producing thermal energy in the form of heat and heating and drying the milled asphalt product or the cold ingredients and the "filler" charge;
    (3) a combined solar thermal energy module panel adapted with a rectangular tubular coil with heating by sun radiation combined with electrical resistors or gas-fueled heaters to be automatically activated whenever there is no sunlight available; and,
    (4) a heat exchanger adapted with two pipe coils with thermal fluid or gas to preheat the cold ingredients and lower the temperature of the gasses being emitted into the atmosphere;
  (b) carrying the cold ingredients to the circular chamber;
  (c) carrying the "filler" charge to the circular chamber;
  (d) carrying the solid asphalt additive to the circular chamber;
  (e) heating and drying the cold ingredients and the "filler" charge in the circular chamber;
  (f) carrying the milled asphalt product to the circular chamber;
  (g) mixing the milled asphalt product with solid asphalt additive to produce recycled hot-mix asphalt in a quantity of up to 750 (seven hundred and fifty) tons per hour; and, (h) mixing the cold ingredients, the "filler" charge, and liquid asphalt cement to produce hot-mix asphalt in a quantity of up to 750 tons per hour.

2. A method as claimed in claim 1, wherein the method further comprises the steps of:
(i) stopping the operation of an asphalt pump if there occurs any ingress into the chamber, of cold ingredients together with milled product, wherein the asphalt pump is calibrated to produce first grade hot-mix asphalt or hot-mix asphalt using a full percentage of milled product;
(j) receiving the liquid asphalt cement having been weighed rather than measured in terms of mass flow; and
(k) awaiting for the necessary time in the circular chamber that the milled asphalt product be fully recycled without any presence of chunks, homogeneous and with no temperature variations.

3. A method as claimed in claim 1, wherein:
the combined solar thermal energy module panel serves to enhance the heating capacity of the asphalt plant,
the coils of the circular chamber and the combined solar thermal energy module panel are configured such that therein occurs a circulation of thermal fluid or gas for purposes of transfer of thermal energy in the form of heat for heating, drying and mixing the material using a full percentage of granular milled product, in chunks or pieces with sizes of up to 100 mm and solid asphalt additive for producing fully (100%) recycled hot-mix asphalt or for heating, drying and mixing cold ingredients with sizes of up to 75 mm, "filler" charge and liquid asphalt cement for producing first grade hot-mix asphalt, such method further comprising the steps of:
(l) carrying the cold ingredients from a cold feed silo/tank, using grading sieves and preheating the cold ingredients, into the circular chamber for heating, drying and mixing;
(m) carrying the milled asphalt product from the milled asphalt product silo/tank into the chamber for heating, drying and mixing;
(n) mixing the solid asphalt additive with milled asphalt product in sizes of up to 100 mm for producing a fully recycled hot-mix asphalt in a quantity of up to 750 (seven hundred and fifty) tons per hour;
(o) mixing the cold ingredients upon the heating thereof with "filler" charge or fibers and with the liquid asphalt cement for producing hot-mix asphalt in a quantity of up to 750 (seven hundred and fifty) tons per hour; and,
(p) carrying the recycled hot-mix asphalt or first grade hot-mix asphalt into a hot-mix asphalt storage tanks.

4. A method as claimed in claim 1, wherein the recycled hot-mix asphalt produced by the process has a final temperature that is identical to the temperature of the heated and dried milled asphalt product and in that the final temperature of the hot-mix asphalt is higher than the temperature of the heated and dried cold mix.

5. A method as claimed in claim 1, wherein the milled asphalt product, in sizes of up to 100 mm is heated and dried without being mixed with the overheated cold ingredients.

6. A method as claimed in claim 1, wherein the combination of milled asphalt product in sizes of up to 100 mm and the solid asphalt additive constitutes the full percentage (100%) of the material used to produce the recycled hot-mix asphalt.

7. A method as claimed in claim 1, wherein the plant for producing hot-mix asphalt using a full percentage of milled asphalt product or for producing an asphalt mixture with cold mix using combined solar thermal energy further comprises the cooling of the vapor and gas produced in the circular chamber for heating, drying and mixing, where in order to be able to operate, the system used for cooling the temperature of the vapor and gas produced by the circular chamber for heating, drying and mixing materials in order to produce hot-mix asphalt comprises a first circular tubular coil filled with thermal fluid or gas, provided above the half-shafts used for heating, drying and mixing operations, which transfers heat from the mixture to this first coil that heats the side walls of a cold ingredients storage tank, provided with a grading sieve, to provide a degree of preheating and return of the material to the circular chamber using a centrifugal pump to return the same to the first coil provided near the outlet of the filter elements which purpose consists in withdrawing heat from the vapor and gas being let out into the atmosphere and transfer such heat for preheating the cold ingredients, wherein the method further comprises the steps of:
(q) carrying the fluid heated at the source through tubular coils into the cold material receiving silo/tank for cold feed;
(r) reducing the temperature of the vapor and gas vented to the atmosphere; and,
(s) preheating the cold ingredients to produce hot-mix asphalt.

8. A method as claimed in claim 6, characterized by further comprising the step of:
(t) providing a fan for blowing the cooled vapor and gas from the circular chamber.

* * * * *